United States Patent [19]

Shimazu et al.

[11] Patent Number: 5,379,350
[45] Date of Patent: Jan. 3, 1995

[54] METHOD AND APPARATUS FOR EXTRACTING A CONTOUR OF AN IMAGE

[75] Inventors: Shigeaki Shimazu, Kyoto; Tetsuo Asano, Toyonaka; Nobuaki Usui, Tokyo; Kazuhiro Nakai, Kyoto, all of Japan

[73] Assignee: Dainippon Screen Mfg. Co., Ltd., Kyoto, Japan

[21] Appl. No.: 19,374

[22] Filed: Feb. 18, 1993

[30] Foreign Application Priority Data

Feb. 27, 1992 [JP] Japan ................. 4-076369

[51] Int. Cl.⁶ ............................................. G06K 9/48
[52] U.S. Cl. ...................................... 382/22; 382/21; 382/60
[58] Field of Search ............... 382/21, 22, 60; 395/142, 143

[56] References Cited

U.S. PATENT DOCUMENTS

| | | |
|---|---|---|
| 3,713,098 | 1/1973 | Muenchhausen et al. ............ 382/22 |
| 4,956,869 | 9/1990 | Miyatake et al. .................... 382/21 |
| 5,214,718 | 5/1993 | Khosla ............................... 382/21 |
| 5,228,097 | 7/1993 | Kumagai ............................ 382/21 |

FOREIGN PATENT DOCUMENTS

| | | |
|---|---|---|
| 63-204376 | 8/1988 | Japan . |
| 2201562A | 1/1988 | United Kingdom . |
| 2201562 | 9/1988 | United Kingdom . |

OTHER PUBLICATIONS

Patent Abstracts of Japan, vol. 9, No. 273 (P-401) 30 Oct. 1985 & JP-A-60 117 381 (Fujitsu KK) 24 Jun. 1985.
IBM Technical Disclosure Bulletin, vol. 26, No. 10A, Mar. 1984, pp. 5279-5282, G. M. Bednar et al., 'Character contour measurements from character images stored in runlength form'.
Patent Abstracts of Japan, vol. 9, No. 239 (P-391) 25 Sep. 1985 & JP-A-60 093 572 (Fuji Denki Seizo KK) 25 May 1985.
Gonzalez et al., Digital Image Processing. Addison-Wesley 1977, pp. 253-261 and 363-367.
Capson, "An Improved Algorithm for the Sequential Extraction of Boundaries from Raster Scan", *Computer Vision, Graphics, and Image Processing*, vol. 28 (1984), pp. 109-125.

*Primary Examiner*—Joseph Mancuso
*Assistant Examiner*—Jon Chang
*Attorney, Agent, or Firm*—Lowe, Price, LeBlanc & Becker

[57] ABSTRACT

The present invention provides an improved technique for extracting contours in an image without waiting for processing of all the scanning lines in the image. Run-data on two boundary scanning lines, each representing the boundary coordinates at which the image changes, are stored in a run-data buffer. A contour extraction unit compares two sets of the run-data with one another to extract segment vectors and detect a set of closed-loop vectors defining a contour of a image area. Three registers in a working buffer store specific data representing the relationship between a starting point and a terminal point of each vector sequence and are used in detecting closed-loop vectors. A vector data memory stores vector data including coordinate values of start and end points of closed-loop vectors. The contour extraction unit detects a vector sequence which has a starting point identical with a terminal point as a function of the data registered in the working buffer to identify the vector sequence as a closed-loop.

8 Claims, 28 Drawing Sheets

Fig. 1(a)    Fig. 1(b)
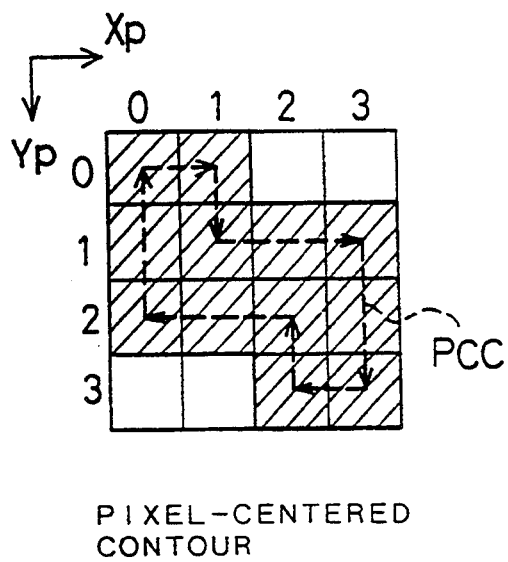
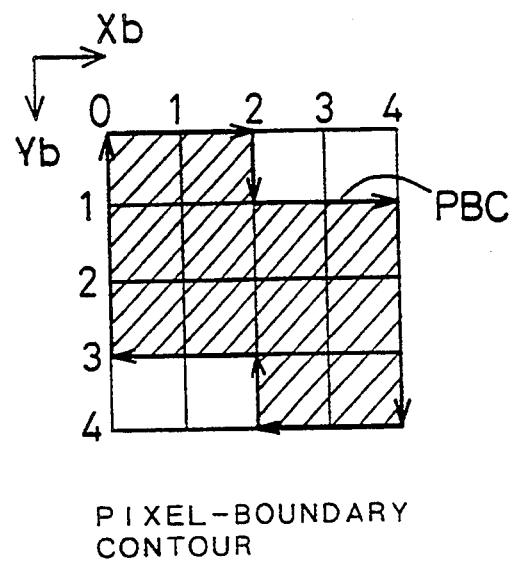
PIXEL-CENTERED
CONTOUR
PIXEL-BOUNDARY
CONTOUR
Fig. 1(c)
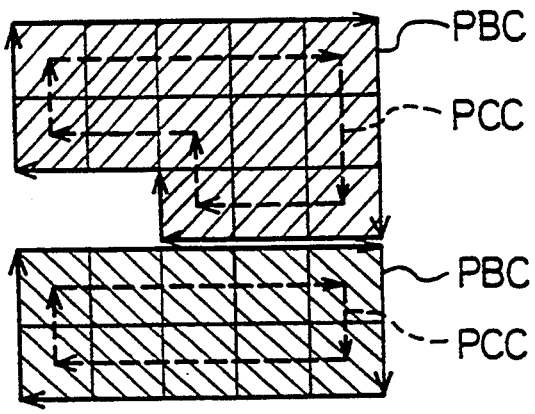

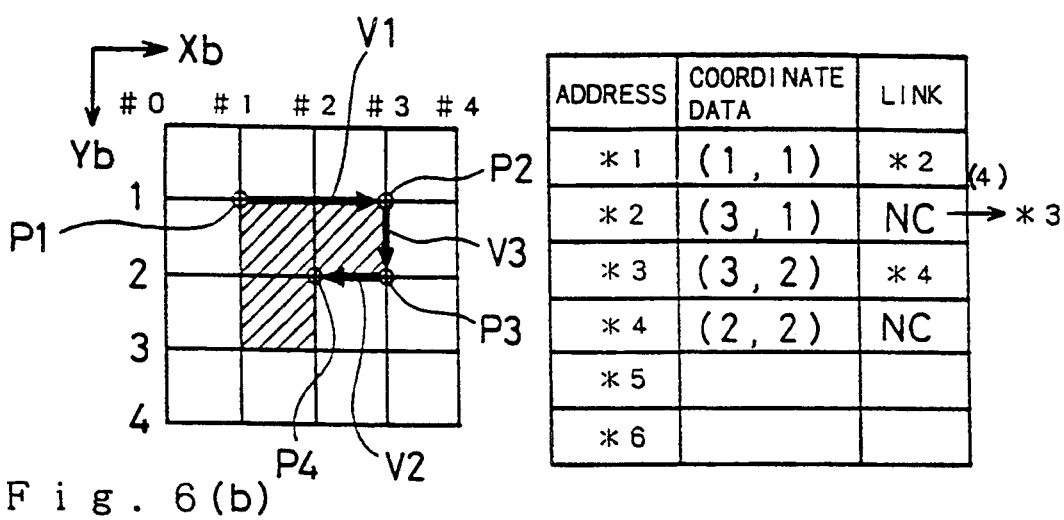

Fig. 7(a)
CONTOUR VECTORS
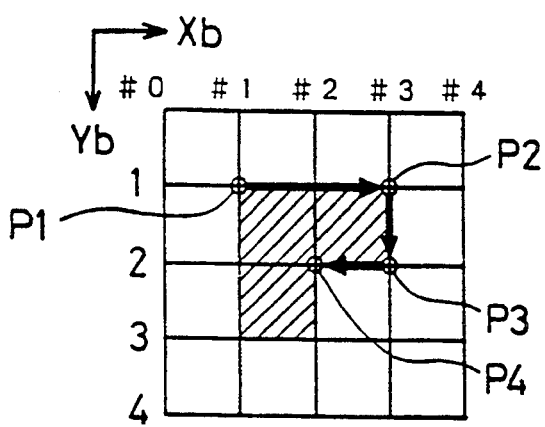
Fig. 7(c)
VECTOR DATA MEMORY 58
| ADDRESS | COORDINATE DATA | LINK |
|---------|-----------------|------|
| *1 | (1,1) | *2 |
| *2 | (3,1) | *3 |
| *3 | (3,2) | *4 |
| *4 | (2,2) | NC |
| *5 | | |
| *6 | | |
Fig. 7(b)
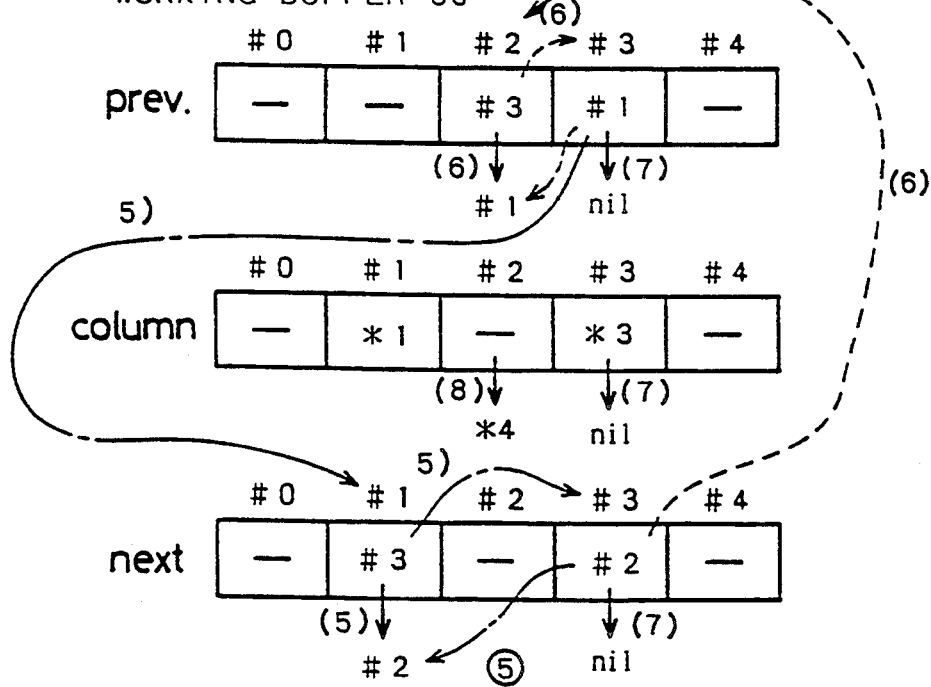

CONTOUR VECTORS

VECTOR DATA MEMORY 58

Fig. 14(a)
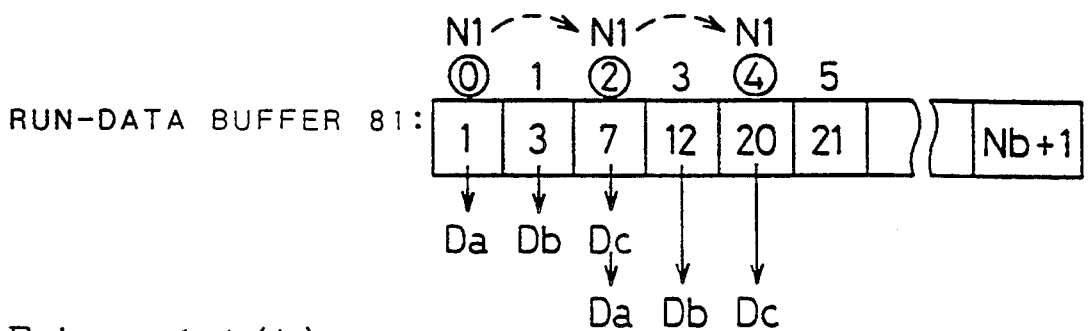
Fig. 14(b)
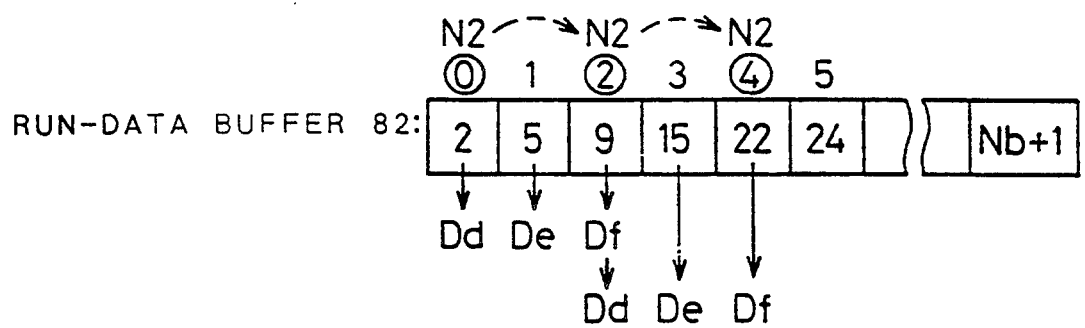
Fig. 14(c)
WORK DATA:
| Da | 1 |
|----|---|
| Db | 3 |
| Dc | 7 |
| Dd | 2 |
| De | 5 |
| Df | 9 |

CONDITION 1
[ De < Da ]

CONDITION 2
[ Da ≦ De and Db < Dd ]

CONDITION 3 [ Da≦De and Dd≦Db ] and
CONDITION 4 [ Db≦Df and De≦Dc ]

CONDITION 3 [ Da≦De and Dd≦Db ] and
CONDITION 4 [ Db≦Df and De≦Dc ]

CONDITION 3 [ $Da \leq De$ and $Dd \leq Db$ ] and
CONDITION 5 [ $Df < Db$ ]

CONDITION 3 [ $Da \leq De$ and $Dd \leq Db$ ] and
CONDITION 6 [ $Dc < De$ ]

Fig. 21(a)
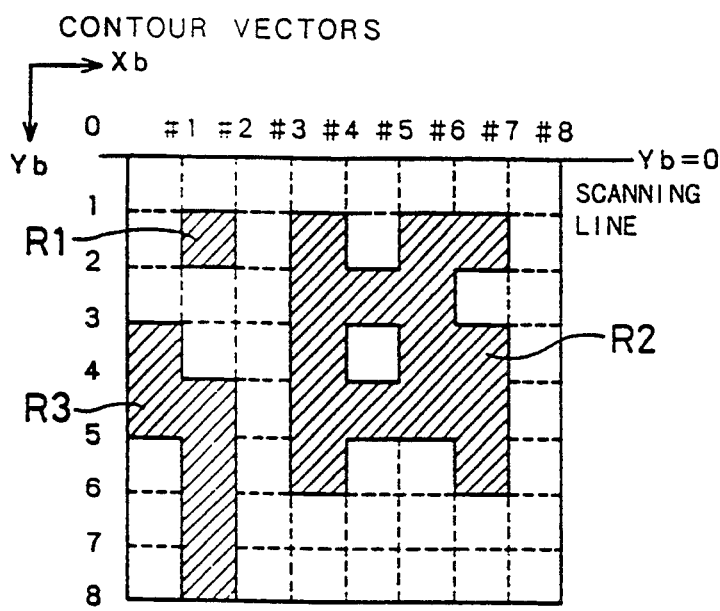
Fig. 21(b)
RUN-DATA BUFFER 54
(81) 
(82) 
Fig. 21(c)
WORKING BUFFER 56
prev. 
clum 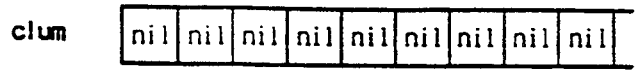
next 
Fig. 21(d)
VECTOR DATA MEMORY 58
| ADDRESS | COORDINATE | LINK |
|---|---|---|
| *1 | | |
| *2 | | |
| *3 | | |
| *4 | | |
| *5 | | |
| *6 | | |
| *7 | | |
| *8 | | |
| *9 | | |
| *10 | | |
| *11 | | |
| *12 | | |
| *13 | | |
| *14 | | |
| *15 | | |
| *16 | | |
| *17 | | |
| *18 | | |
| *19 | | |
| *20 | | |
| *21 | | |
| *22 | | |
| *23 | | |
| *24 | | |
| *25 | | |
| *26 | | |
| *27 | | |
| *28 | | |
| *29 | | |
| *30 | | |
| *31 | | |
| *32 | | |
(Xb,Yb) CLOSED LOOP VECTOR DATA
☐ VACANCY

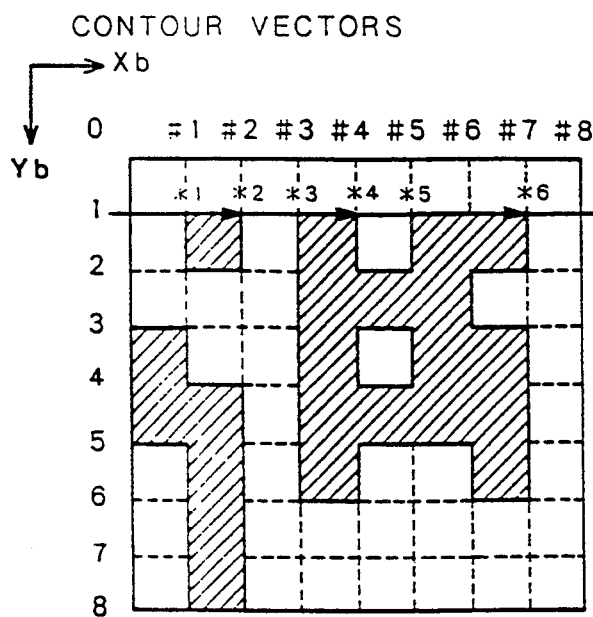

RUN-DATA BUFFER 54

(81) | 1 | 2 | 3 | 4 | 5 | 7 | e | | | |

(82) | 3 | 6 | e | | | | | | | |

WORKING BUFFER 56

```
        #0  #1   #2   #3  #4   #5  #6   #7   #8
prev.   -   -    -    -   -    -   3    -    -
clum   nil  nil  nil  *3  nil  nil *12  nil  nil
next    -   -    -    6   -    -   -    -    -
```

VECTOR DATA MEMORY 58

| ADDRESS | COORDINATE | LINK |
|---|---|---|
| *1 | ( 1 . 1 ) | *2 |
| *2 | ( 2 . 1 ) | *7 |
| *3 | ( 3 . 1 ) | *4 |
| *4 | ( 4 . 1 ) | *9 |
| *5 | ( 5 . 1 ) | *6 |
| *6 | ( 7 . 1 ) | *11 |
| *7 | ( 2 . 2 ) | *8 |
| *8 | ( 1 . 2 ) | *1 |
| *9 | ( 4 . 2 ) | *10 |
| *10 | ( 5 . 2 ) | *5 |
| *11 | ( 7 . 2 ) | *12 |
| *12 | ( 6 . 2 ) | nc |
| *13 | | |
| *14 | | |
| *15 | | |
| *16 | | |
| *17 | | |
| *18 | | |
| *19 | | |
| *20 | | |
| *21 | | |
| *22 | | |
| *23 | | |
| *24 | | |
| *25 | | |
| *26 | | |
| *27 | | |
| *28 | | |
| *29 | | |
| *30 | | |
| *31 | | |
| *32 | | |

(Xb,Yb) CLOSED LOOP VECTOR DATA

☐ VACANCY

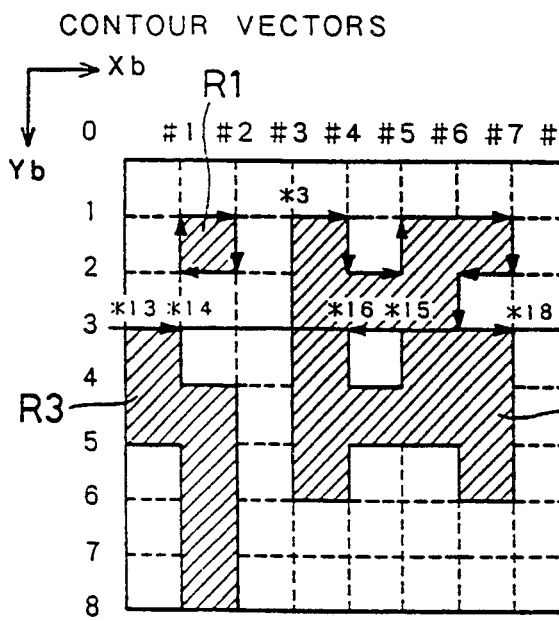

CONTOUR VECTORS

RUN-DATA BUFFER 54

(81) | 0 | 1 | 3 | 4 | 5 | 7 | e |   |   |

(82) | 0 | 2 | 3 | 7 | e |   |   |   |   |

WORKING BUFFER 56

```
       #0  #1  #2  #3  #4  #5  #6  #7  #8
prev.  -   -   0   -   -   -   -   3   -
clum  *13 nil *20 *3  nil nil nil *18 nil
next   2   -   -   7   -   -   -   -   -
```

VECTOR DATA MEMORY 58

| ADDRESS | COORDINATE | LINK |
|---|---|---|
| *1 |  |  |
| *2 |  |  |
| *3 | ( 3, 1 ) | *4 |
| *4 | ( 4, 1 ) | *9 |
| *5 | ( 5, 1 ) | *6 |
| *6 | ( 7, 1 ) | *11 |
| *7 |  |  |
| *8 |  |  |
| *9 | ( 4, 2 ) | *10 |
| *10 | ( 5, 2 ) | *5 |
| *11 | ( 7, 2 ) | *12 |
| *12 | ( 6, 2 ) | *17 |
| *13 | ( 0, 3 ) | *14 |
| *14 | ( 1, 3 ) | *19 |
| *15 | ( 5, 3 ) | *16 |
| *16 | ( 4, 3 ) | *21 |
| *17 | ( 6, 3 ) | *18 |
| *18 | ( 7, 3 ) | nc |
| *19 | ( 1, 4 ) | *20 |
| *20 | ( 2, 4 ) | nc |
| *21 | ( 4, 4 ) | *22 |
| *22 | ( 5, 4 ) | *15 |
| *23 |  |  |
| *24 |  |  |
| *25 |  |  |
| *26 |  |  |
| *27 |  |  |
| *28 |  |  |
| *29 |  |  |
| *30 |  |  |
| *31 |  |  |
| *32 |  |  |

(Xb,Yb)  CLOSED LOOP VECTOR DATA

☐ VACANCY

CONTOUR VECTORS

RUN-DATA BUFFER 54

(81) | 0 | 2 | 3 | 7 | e | | | | |

(82) | 1 | 2 | 3 | 4 | 6 | 7 | e | | |

WORKING BUFFER 56

```
      #0  #1  #2  #3  #4  #5  #6  #7  #8
prev.  -   -   1   -   6   -   -   3   -
clum  nil *23 *20  *3 *26 nil *25 *18 nil
next   -   2   -   7   -   -   4   -   -
```

VECTOR DATA MEMORY 58

| ADDRESS | COORDINATE | LINK |
|---|---|---|
| *1 | | |
| *2 | | |
| *3 | (3, 1) | *4 |
| *4 | (4, 1) | *9 |
| *5 | (5, 1) | *6 |
| *6 | (7, 1) | *11 |
| *7 | | |
| *8 | | |
| *9 | (4, 2) | *10 |
| *10 | (5, 2) | *5 |
| *11 | (7, 2) | *12 |
| *12 | (6, 2) | *17 |
| *13 | (0, 3) | *14 |
| *14 | (1, 3) | *19 |
| *15 | | |
| *16 | | |
| *17 | (6, 3) | *18 |
| *18 | (7, 3) | nc |
| *19 | (1, 4) | *20 |
| *20 | (2, 4) | nc |
| *21 | | |
| *22 | | |
| *23 | (1, 5) | *24 |
| *24 | (0, 5) | *13 |
| *25 | (6, 5) | *26 |
| *26 | (4, 5) | nc |
| *27 | | |
| *28 | | |
| *29 | | |
| *30 | | |
| *31 | | |
| *32 | | |

(Xb,Yb) CLOSED LOOP VECTOR DATA

☐ VACANCY

VECTOR DATA MEMORY 58

| ADDRESS | COORDINATE | LINK |
|---|---|---|
| *1 | | |
| *2 | | |
| *3 | (3, 1) | *4 |
| *4 | (4, 1) | *9 |
| *5 | (5, 1) | *6 |
| *6 | (7, 1) | *11 |
| *7 | | |
| *8 | | |
| *9 | (4, 2) | *10 |
| *10 | (5, 2) | *5 |
| *11 | (7, 2) | *12 |
| *12 | (6, 2) | *17 |
| *13 | (0, 3) | *14 |
| *14 | (1, 3) | *19 |
| *15 | | |
| *16 | | |
| *17 | (6, 3) | *18 |
| *18 | (7, 3) | *29 |
| *19 | (1, 4) | *20 |
| *20 | (2, 4) | nc |
| *21 | | |
| *22 | | |
| *23 | (1, 5) | *24 |
| *24 | (0, 5) | *13 |
| *25 | (6, 5) | *26 |
| *26 | (4, 5) | *27 |
| *27 | (4, 6) | *28 |
| *28 | (3, 6) | *3 |
| *29 | (7, 6) | *30 |
| *30 | (6, 6) | *25 |
| *31 | | |
| *32 | | |

[(Xb, Yb)] CLOSED LOOP VECTOR DATA

[ ] VACANCY

RUN-DATA BUFFER 54

(81) | 1 | 2 | 3 | 4 | 6 | 7 | e | | | |

(82) | 1 | 2 | e | | | | | | | |

WORKING BUFFER 56

0 #1 #2 #3 #4 #5 #6 #7 #8 prev. | - | - | 1 | - | - | - | - | - | - | clum | nil | *23 | *20 | nil | nil | nil | nil | nil | nil | next | - | 2 | - | - | - | - | - | - | - |

CONTOUR VECTORS

RUN-DATA BUFFER 54

(81) | 1 | 2 | e | | | | | | | |

(82) | 1 | 2 | e | | | | | | | |

WORKING BUFFER 56
　　　　#0 #1 #2 #3 #4 #5 #6 #7 #8 prev. | - | - | 1 | - | - | - | - | - | - | clum | nil | *23 | *20 | nil | nil | nil | nil | nil | nil | next | - | 2 | - | - | - | - | - | - | - |

| ADDRESS | COORDINATE | LINK |
|---|---|---|
| *1 | | |
| *2 | | |
| *3 | | |
| *4 | | |
| *5 | | |
| *6 | | |
| *7 | | |
| *8 | | |
| *9 | | |
| *10 | | |
| *11 | | |
| *12 | | |
| *13 | (0,3) | *14 |
| *14 | (1,3) | *19 |
| *15 | | |
| *16 | | |
| *17 | | |
| *18 | | |
| *19 | (1,4) | *20 |
| *20 | (2,4) | nc |
| *21 | | |
| *22 | | |
| *23 | (1,5) | *24 |
| *24 | (0,5) | *13 |
| *25 | | |
| *26 | | |
| *27 | | |
| *28 | | |
| *29 | | |
| *30 | | |
| *31 | | |
| *32 | | |

VECTOR DATA MEMORY 58

(Xb,Yb) CLOSED LOOP VECTOR DATA

☐ VACANCY

Fig. 30

VECTOR DATA
MEMORY 58

| ADDRESS | COORDINATE | LINK |
|---|---|---|
| *1 |  | *2 |
| *2 |  | *7 |
| *3 | ( 3, 1 ) | *4 |
| *4 | ( 4, 1 ) | *9 |
| *5 | ( 5, 1 ) | *6 |
| *6 | ( 7, 1 ) | *11 |
| *7 |  | *8 |
| *8 |  | *19 |
| *9 | ( 4, 2 ) | *10 |
| *10 | ( 5, 2 ) | *5 |
| *11 | ( 7, 2 ) | *12 |
| *12 | ( 6, 2 ) | *17 |
| *13 | ( 0, 3 ) | *14 |
| *14 | ( 1, 3 ) | nc |
| *15 | ( 5, 3 ) | *16 |
| *16 | ( 4, 3 ) | nc |
| *17 | ( 6, 3 ) | *18 |
| *18 | ( 7, 3 ) | nc |
| *19 |  |  |
| *20 |  |  |
| *21 |  |  |
| *22 |  |  |
| *23 |  |  |
| *24 |  |  |
| *25 |  |  |
| *26 |  |  |
| *27 |  |  |
| *28 |  |  |
| *29 |  |  |
| *30 |  |  |
| *31 |  |  |
| *32 |  |  |

[*1] ← BAP

METHOD AND APPARATUS FOR EXTRACTING A CONTOUR OF AN IMAGE

BACKGROUND OF THE INVENTION

1. Field of the Invention

The present invention relates to a method of and an apparatus for extracting a contour of an image, and or more particularly extracting a contour running at the boundary between pixels.

2. Description of the Related Art

In prepress process, some image parts are enlarged or reduced, rotated, and laid out to constitute one-page-image before printing plates of the one-page-image are produced, The one-page-image was previously manually prepared. Recent advances in computer technology have allowed the preparation of an one-page-image with the aid of computers.

In preparation of an one-page-image, contour tracing of image parts are performed to extract data prior to processing the image parts. After the contour extraction, the portions of the image parts defined by the contours are processed in various ways: for example, a fine conversions including rotation, enlargement, and reduction; coloring the image portion; and logical operation between the contours such as logical product (AND), logical sum (OR), exclusive OR, and inversion.

A method of contour tracing is disclosed in UK Patent GB 2,201,562A, to Miyatake et. al., published on Sep. 1, 1988. The contour in this method is defined by segments drawn between boundaries of pixels. This method includes the steps of: comparing contour lines of an image on plural scanning lines with predetermined basic contour patterns, which are illustrated in FIG. 2 of the patent, to thereby identify the basic contour patterns included in the contour lines; and linking the identified basic contour patterns for all the scanning lines on a screen page to make the contour of the image.

Since basic contour patterns are initially searched on all of the scanning lines in the prior art method mentioned above, a device for other processing such as affine conversion should suspend its operation and stand by during the search. Thus the overall processing for the image requires an undesirably long time.

SUMMARY OF THE INVENTION

An object of the invention is accordingly to extract a contour of an image part without searching or processing all the scanning lines in the image part.

The present invention is directed to a method of extracting a closed-loop contour of an image part in a binary image including a plurality of pixels, the closed-loop contour being expressed by a vector sequence including a plurality of contour vectors each connecting vertices of the closed-loop contour, each the vertex being defined by boundary coordinate systems (Xb, Yb) indicating a position at a boundary between pixels.

The method comprises the steps of: (a) preparing binary image data representing the binary image, and (b) storing the binary image data in an image memory; selecting two adjacent scanning lines parallel to an axis of the boundary coordinate system Xb; (c) converting the binary image data for the selected two adjacent scanning lines into two sets of run-data, and storing the two sets of run-data in a run-data memory, each the run-data expressing boundary positions at which the binary level of the binary image data changes, each the boundary position being expressed by the boundary coordinate Xb; (d) comparing the two sets of run-data with each other to detect a first Xb-vector, the first Xb-vector being one of the plurality of contour vectors and extending along the axis of the boundary coordinate Xb between the selected two adjacent scanning lines, to thereby store coordinate data of a start point and an end point of the first Xb-vector in a vector data memory; detecting a Yb-vector extending in the axis of the boundary coordinate Yb as a result of the comparison, the Yb-vector being one of the plurality of contour vectors and connecting the first Xb-vector with a second Xb-vector which is previously detected, to thereby store coordinate data representing a start point and an end point of the Yb-vector in the vectoc data memory, and generating link data indicating connection among the Yb-vector, the first Xb-vector and the second Xb-vector to form a vector sequence, and storing the link data in the vector data memory; and detecting a closed-loop contour represented by the vector sequence; (e) producing closed-loop vector data representing the closed-loop contour; and (f) repeating the steps (b) through (e) while updating the two adjacent scanning lines by one scanning line at a time, to thereby extract at least one closed-loop contour in the binary image.

The above method allows a contour of an image to be extracted without processing all the scanning lines on the image. In other words, the method detects contour vectors while updating the scanning lines one by one, and extracts a vector sequence representing a contour of an image.

Preferably, the step (d) comprises the steps of: (d-1) producing correspondence data representing positional relationship between a starting point and a terminal point of the vector sequence, to store the correspondence data in a data register; and (d-2) identifying the vector sequence as that representing a closed-loop contour when the correspondence data of the vector sequence indicates that the starting point and the terminal point of the vector sequence are identical with each other. The correspondence data helps to easily detect a vector sequence representing a closed-loop contour.

According to a preferred embodiment of the present invention, the data register comprises a first register for storing a first address value of the vector data memory, at which the coordinate data of the starting point of the vector sequence is stored, at a position in the first register corresponding to the boundary coordinate value Xb of the starting point, and a second address value of the vector data memory, at which the coordinate data for the terminal point of the vector sequence is stored, at a position in the first register corresponding to the boundary coordinate value Xb of the terminal point; a second register for storing the boundary coordinate value Xb of the starting point of the vector sequence at a position in the second register corresponding to the boundary coordinate value Xb of the terminal point of the vector sequence; and a third register for storing the boundary coordinate value Xb of the terminal point of the vector sequence at a position in the third register corresponding to the boundary coordinate value Xb of the starting point of the vector sequence.

The step (d) further comprises the step of: (d-3) storing vector data of the first Xb-vector in the vector data memory, the vector data including coordinate data (Xs, Ys) of the start point of the first Xb-vector, coordinate data (Xe, Ye) of the end point of the first Xb-vector, and link data indicating connection between the start point with the end point; and the step (d-1) comprises the step of: (g) storing address values of the vector data for the start point and the end point of the first Xb-vector, which vector data are stored in the vector data memory in the step (d-3), at respective positions in the first register corresponding to the boundary coordinate value Xs of the start point of the boundary coordinate value Xe of the end point, respectively, and storing the boundary coordinate value Xs of the start point at a position in the second register corresponding to the boundary coordinate value Xe of the end point; and storing the boundary coordinate value Xe of the end point at a position in the third register corresponding to the boundary coordinate value Xs of the start point; and the step (d-2) further comprising the steps of: (h) detecting the Yb-vector as a function of registered data in the first register, storing the link data for the detected Yb-vector in the vector data memory, updating registered data in the second register and the third register related to the starting point and the terminal point of the vector sequence including the detected Yb-vector, and eliminating data related to the start point and the end point of the detected Yb-vector stored in the first, second and third registers, to thereby connect the detected Yb-vector successively with the first Xb-vector and the second Xb-vector; and (i) identifying the vector sequence as that representing a closed-loop contour under the conditions that the coordinate value stored at a position in the second register corresponding to the boundary coordinate value Xs of the start point is identical with the coordinate value stored at a position in the third register corresponding to the boundary coordinate value Xs of the start point and that the coordinate value stored at a position in the second register corresponding to the boundary coordinate value Xe of the end point is identical with the coordinate value stored at a position in the third register corresponding to the boundary coordinate value Xe.

According to another aspect of the present invention, the step (a) comprises the step of: (j) preparing multi-tone image data representing a multi-tone image, and converting the multi-tone image data into the binary image data with a predetermined threshold value.

According to still another aspect of the present invention, the step (d) comprises the step of: (k) comparing coordinate values of three consecutive boundary positions indicated by the first set of the run-data and coordinate values of three consecutive boundary positions indicated by the second set of the run-data, to thereby detect the first Xb-vector and the Yb-vector.

The present invention is also directed to a contour extracting apparatus for extracting a closed-loop contour of an image part in a binary image including a plurality of pixels, the closed-loop contour being expressed by a vector sequence including a plurality of contour vectors each connecting vertices of the closed-loop contour, each the vertex being defined by boundary coordinate systems (Xb, Yb) indicating a position at a boundary between pixels, the apparatus comprising: a binary image memory for storing binary image data representing the binary image; run-data conversion means for selecting two adjacent scanning lines parallel to an axis of the boundary coordinate Xb, converting the binary image data for the selected two adjacent scanning lines into two sets of run-data, each the run-data expressing boundary positions at which the binary level of the binary image data changes, each the boundary position being expressed by the boundary coordinate Xb; a run-data memory for storing the two sets of run-data; a vector data memory; and contour extraction means. The contour extraction means compares the two sets of run-data with each other to detect a first Xb-vector, the first Xb-vector being one of the plurality of contour vectors and extending along the axis of the boundary coordinate Xb between the selected two adjacent scanning lines; for writing coordinate data of a start point and an end point of the first Xb-vector in the vector data memory; and detects a Yb-vector, extending in the axis of the boundary coordinate Yb as a result of the comparison, the Yb-vector being one of the plurality of contour vectors and connects the first Xb-vector with a second Xb-vector which is previously detected, to thereby write coordinate data representing a start point and an end point of the Yb-vector in the vector data memory. The contour extraction means further generates link data indicating connection among the Yb-vector, the first Xb-vector, and the second Xb-vector to form a vector sequence, and writes the link data in the vector data memory; and detects a closed-loop contour, represented by the vector sequence, and produces closed-loop vector data representing the closed-loop contour.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 1(a) through 1(c) show the comparison between the contour of pixels and the contour of the boundary;

FIGS. 6(a) through 6(c) show linkage process subsequent to detection of each contour vector;

FIGS. 7(a) through 7(c) show linkage process subsequent to detection of each contour vector;

FIGS. 8(a) through 8(c) show linkage process subsequent to detection of each contour vector;

FIGS. 14(a) through 14(c) are explanatory views illustrating data used in the vector detection;

FIGS. 21(a) through 21(d) show a process for extracting contour vectors along each boundary scanning line;

FIGS. 22(a) through 22(d) show a process for extracting contour vectors along each boundary scanning line;

FIGS. 24(a) through 24(d) show a process for extracting contour vectors along each boundary scanning line;

FIGS. 29(a) through 29(d) show a process for extracting contour vectors along each boundary scanning line; and FIG. 30 shows a method of managing vacant spaces in the vector data memory unit.

DESCRIPTION OF THE PREFERRED EMBODIMENT

A. Pixel-centered Contour and Pixel-boundary Contour

FIGS. 1(a) through 1(c) show the comparison between the pixel-centered contour and the pixel boundary contour. In this embodiment, a monochrome image is used for convenience of explanation.

A pixel-centered contour PCC is constituted by vectors whose end points are defined by pixel coordinates Xp, Yp as shown in FIG. 1(a). The contour vector of the pixel centered contour passes through the centers of pixels. On the other hand, a pixel-boundary contour PBC is constituted by vectors whose end points are defined by boundary coordinates (coordinates of the boundary between pixels) Xb, Yb as shown in FIG. 1(b). The contour vectors of the pixel-boundary contour runs along the outer boundary of pixels.

The pixel-boundary contour has the following advantages over the pixel-centered contour:

(1) The pixel-boundary contour can show an image area of one pixel width with vectors while the pixel-centered contour can not.

(2) When two image areas are contacting each other as shown in FIG. 1(c), the contact is readily detected with the pixel-boundary contours PBC because they have an overlap of the contour vectors showing the contact, whereas it is difficult to detect the contact with the pixel-centered contours PCC because they have no the contour vectors overlapping each other.

(3) When image reduction processing such as data skipping is performed prior to outputting an image to devices with various resolutions, for example, a CRT (cathode ray tube) and a printer, the pixel-boundary contour has a smaller error inherent in the reduction processing than the pixel-centered contour. In the pixel-centered contour, the shape of the contour represents an arrangement of pixels linked by the contour vectors; namely, the size of a pixel affects the shape of the contour after the reduction. On the contrary, with the pixel-boundary contour, the contour vectors can reflect the shape of the original contour more precisely even after the reduction.

(4) The pixel-centered contour has a larger error inherent in affine conversion or other transform processing than the pixel-boundary contour for the reason mentioned in (3).

This invention pertains to a novel technique for extracting the pixel-boundary contour having the advantages described above.

B. Structure of Apparatus

Figure 2:
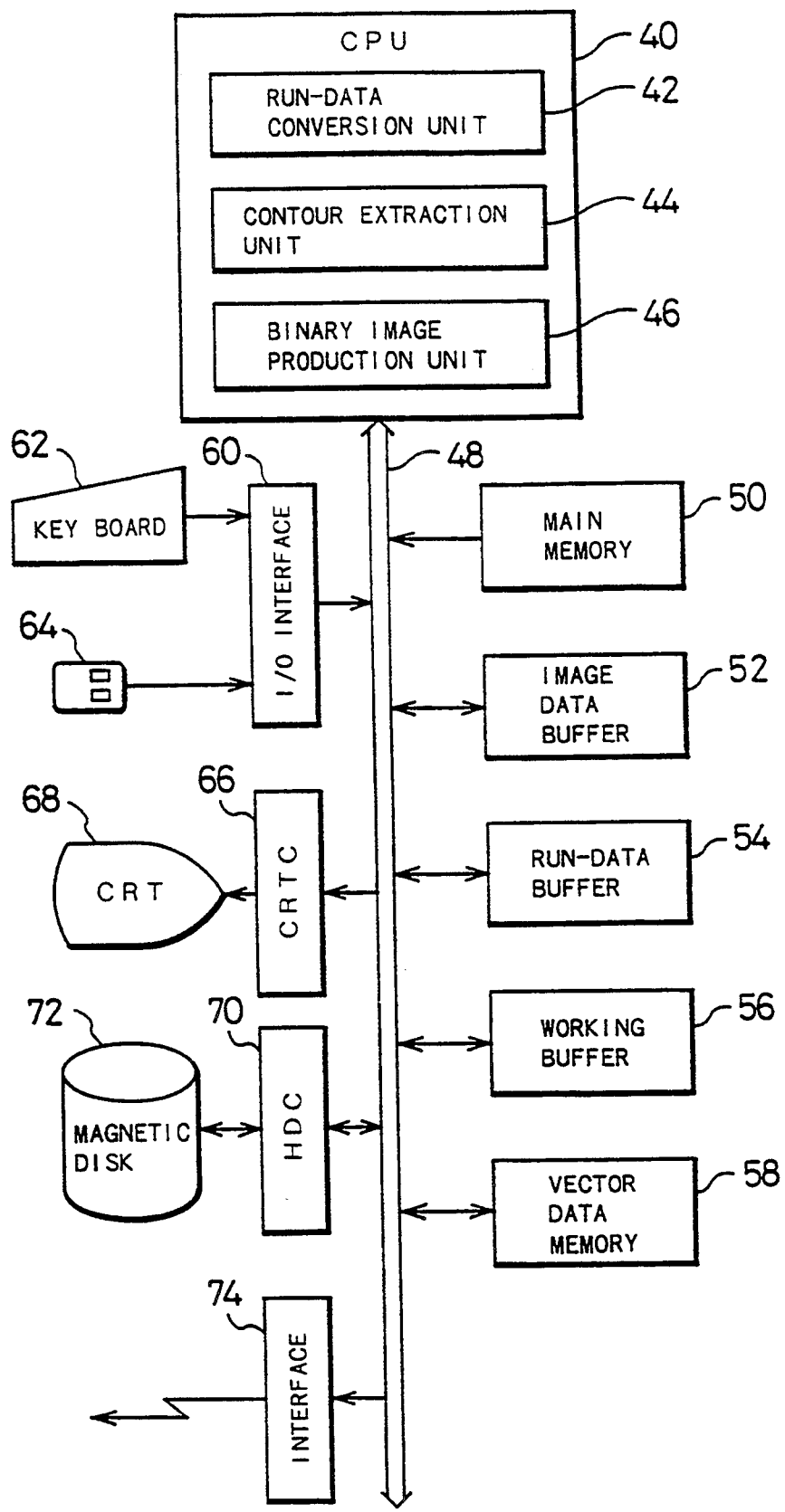
FIGS. 2 and 3 are block diagrams showing structure of a contour-extracting apparatus embodying the invention.

FIG. 2 is a block diagram showing the structure of a contour extraction apparatus embodying the present invention. The apparatus is a computer comprising the CPU 40 including a run-data conversion unit 42, a contour extraction unit 44, and a binary image production unit 46. The units 42, 44, and 46 are implemented by the software programs stored in a main memory 50. Four buffers 52, 54, 56, and 58, which will be described later, are connected to a bus line 48 in the computer. Various peripheral devices are also connected to the bus line 48 with respective interfaces: a keyboard 62 and a mouse 64 with an I/O interface 60, a cathode ray tube 68 with a CRT controller 66, and a magnetic disk 72 with a hard disk controller 70. A vector data output interface 7 is also connected to the bus line 48.

Figure 3:
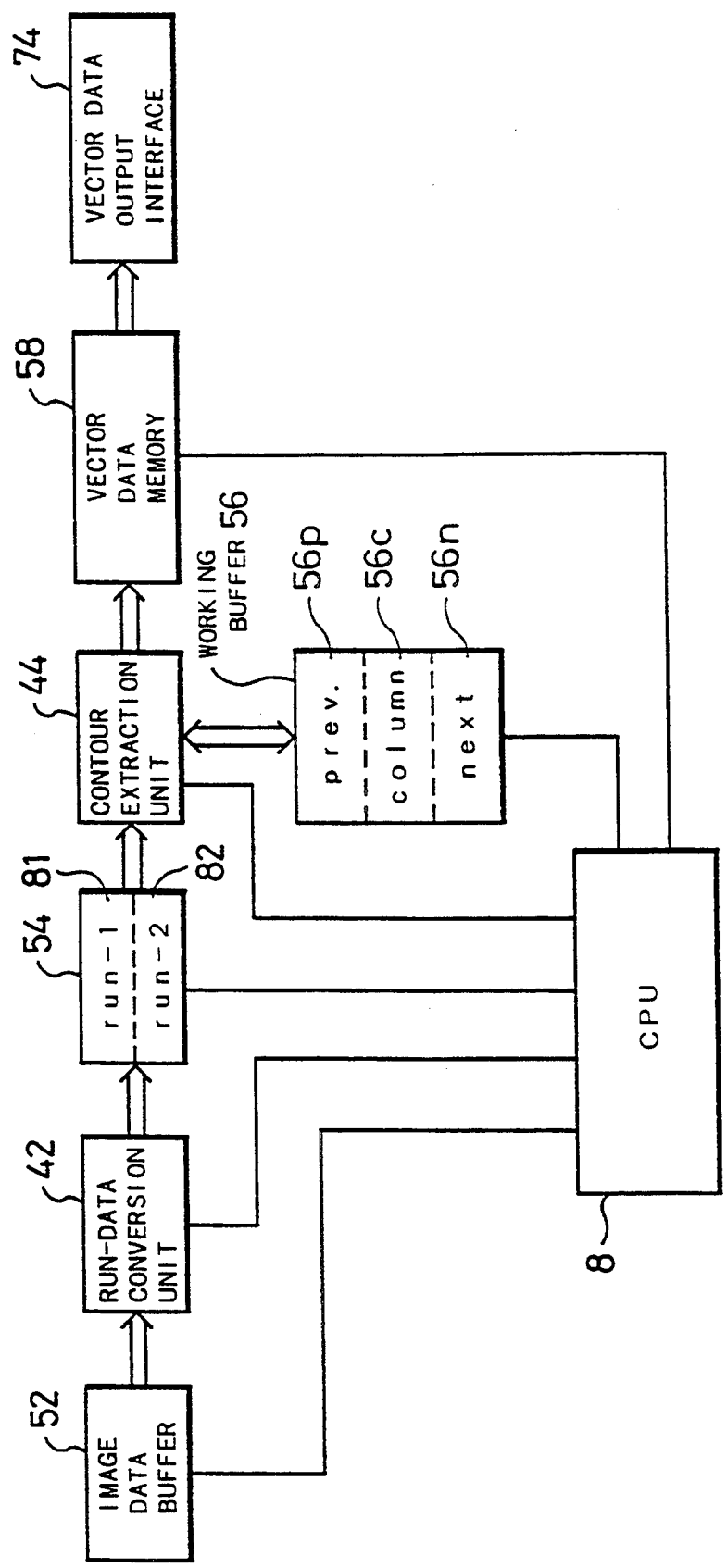

FIG. 3 is a block diagram illustrating the functional connection between the main elements of the apparatus, which are used in extracting contours. The function of each element is as follows:

Image data buffer 52: This buffer stores image data supplied from other devices. The image data may be pixel data representing an image with respect to each pixel in the image, or vector data representing outlines of characters and figures. The contour-extracting processes image data according to pipeline processing (a method continuously processing image data for one scanning line at a time), and the required capacity of the buffer 52 is thus only for one scanning line.

Run data conversion unit 42: This unit converts image data outputted from the image data buffer 52 into run-data showing a point of change in image data along each scanning line with the boundary coordinates. The method of conversion from image data to run-data is described later.

Run-data buffer 54: This buffer temporarily stores run-data generated by the run-data conversion unit 42. The run-data buffer 54 includes a first run-data buffer 81 for storing run-data of a preceding scanning line, and a second run-data buffer 82 for storing run-data of a current scanning line.

Contour extraction unit 44: This unit 44 detects vertices of a contour, generates segment vectors representing segments of the contour, and detects a closed-loop formed by linking the segment vectors. Details of these processing will be described later.

Working buffer 56: This buffer temporarily stores data used for the contour extraction process. The buffer 56 includes a first register or "previous-register" 56p, a second register or "column-register" 56c, and a third register or "next-register" 56n. Usage of these registers will be described later in detail.

Vector data memory 58: This memory stores coordinate data of contour vectors and linkage data representing the linkage of the coordinate data (the linkage data will be hereinafter referred to as a link pointer).

Vector data output interface 74: This interface outputs closed-loop vector data of the extracted contour to outer devices.

C. Method of Converting image data into run-data

Figure 4:
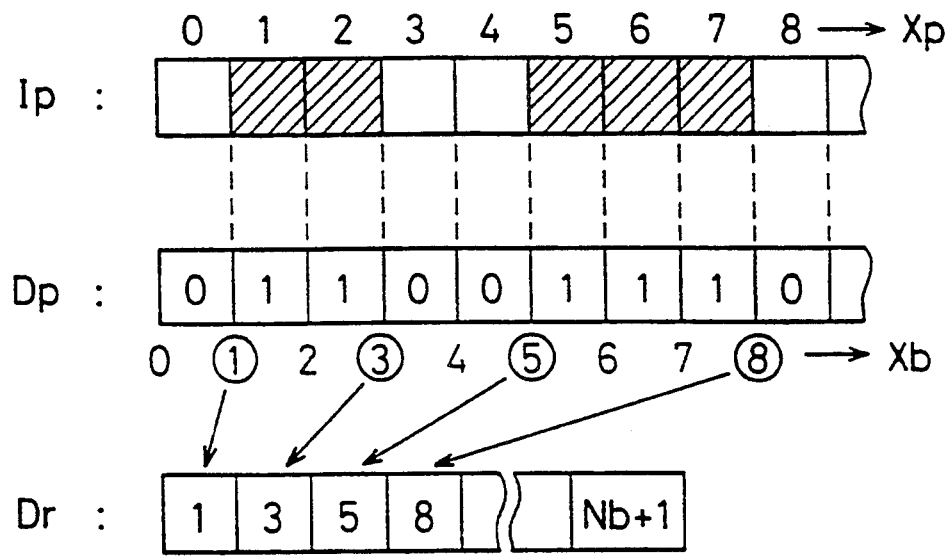
FIGS. 4(a) and 4(b) show a method of conversion of image data into run data in the run data conversion unit 2 of the apparatus.
Figure 4:
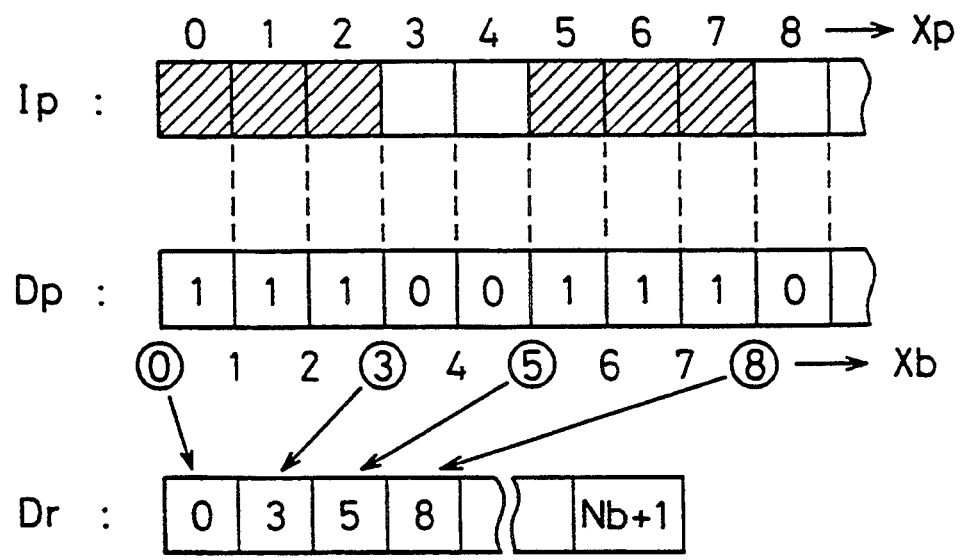

FIGS. 4(a) and 4(b) schematically illustrate a method of converting binary image data into run-data by the run-data conversion unit 42. Each of FIGS. 4(a) and 4(b) shows a monochrome image Ip on one scanning line, image data Dp representing the image, and run-data Dr obtained by converting the image data Dp. The first pixel on a given scanning line is white in FIG. 4(a), while it is black in FIG. 4(b).

The run-data Dr includes a sequence of the boundary coordinate Xb at which the value of the image data Dp changes. At the end of the m-data Dr for the given scanning line, the maximum value Nb of the boundary coordinate Xb plus one, or Nb+1, which is equal to the number of pixels on the scanning line plus one, is repeated three times as end data representing the end of the scanning line. The end data (Nb+1) accordingly defines the end of the run-data Dr for the given scanning line. When the first pixel on the scanning line is black as shown in FIG. 4(b), the first valise of the run-data Dr is equal to zero.

D. Linkage Process After Detection of Contour Vectors

Since one of the main features of the present invention is how to link contour vectors, the linkage process will be described before explaining how to detect contour vectors.

FIGS. 5(a) through 9(c) illustrate the linkage process subsequent to detection of each contour vector. The linkage process denotes updating the linkage of contour vectors, or more concretely registering specific data representing start point and end point of each contour vector in the working buffer 56 and the vector data memory 58. The contour extraction unit 44 executes this linkage process.

In FIGS. 5(a) through 9(c), a symbol '*' is added to the address of the vector data memory 58 at its front end for distinguishing the address from other data. Another symbol '#' is added to the boundary coordinate Xb at its front end. In the following explanation, 'column [#Xb]' denotes either the position of the boundary coordinate Xb in the column-register 56c or the data stored at the position [#Xb] in the column-register 56c, and 'prey [#Xb]' and 'next [#Xb]' have the similar meanings.

Figures 5A, 5B, 5C:
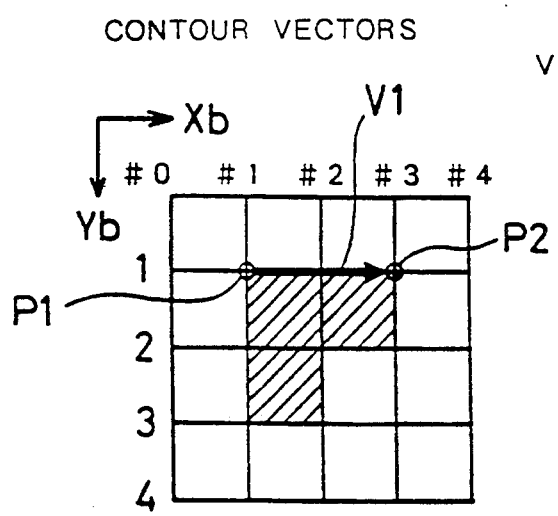
FIGS. 5(a) through 5(c) show linkage process subsequent to detection of each contour vector, where data is registered in the working buffer unit 5 and the vector data memory unit 6 of the apparatus.

FIG. 5(a) shows a detected contour vector V1. The boundary coordinates (Xb, Yb) of a start point P1 and an end point P2 of the vector V1 are respectively stored at addresses *1 and *2 in the vector data memory 58. Link data at each address of the vector data memory 58 indicates the address of another coordinate data which is linked with the coordinate data stored at each respective address. In this embodiment, the link data indicates the address at which the coordinate data of the end point of the vector is stored. For example, in FIG. 5(c), the coordinate data (1,1) of the start point P1 of the vector V1 is stored at address *1, and the link data at address *1 shows address *2 where the coordinate data (3,1) of the end point P2 is stored. The link data 'NC' stored at the address *2 indicates that there is no other address linked to address *2.

As shown in FIG. 5(b), the three registers of the working buffer 56 can store one data for each boundary coordinate Xb. Functions of the three registers are as follows:

The column-register 56c stores the address of the vector data memory 58 at which the coordinate data of the starting point of a vector sequence, or a series of linked vectors, is memorized, at the position corresponding to the boundary coordinate Xb of the starting point. In a similar manner, the address of the memory 58 for the coordinate data of the terminal point of the vector sequence is stored at the position corresponding to the boundary coordinate Xb of the terminal point. In FIG. 5(b), the address *1 of the vector data memory 58, at Which the coordinate data (1,1) of the start point P1 is registered, is written at column[#] corresponding to the boundary coordinate Xb=#1 of the start point P1 of the detected vector V1. The address of the vector data memory 58 will be hereinafter referred to as "address of the coordinate data." The address *2 of the coordinate data (3,1) of the end point P2 is written at column [#3] corresponding to the boundary coordinate Xb=#3 of the end point P2. The symbol '-' in the register shows that no valid data is registered there.

The previous-register 56p stores the value of the boundary coordinate Xb of the starting point of the vector sequence at the position corresponding to the boundary coordinate Xb of the terminal point of the vector sequence. In FIG. 5(b), the boundary coordinate Xb=#1 of the start point P1 of the vector V1 is registered at prev[#3] corresponding to the boundary coordinate Xb=#3 of the end point P2 of the vector V1.

The next-register 56n stores the value of the boundary coordinate Xb of the terminal point of the vector sequence at the position of the boundary coordinate Xb of the starting point of the vector sequence. In FIG. 5(b), the boundary coordinate Xb=#3 of the end point P2 of the vector V1 is registered at next[#1] corresponding to the boundary coordinate Xb=#1 of the start point P1 of the vector V1.

Data stored in these registers correspond to the correspondence data of the claimed invention.

FIGS. 6(a) through 6(c) show linkage process when another vector V2 is detected subsequent to the first vector V1. As will be described later in detail, the contour extraction unit 44 detects the vectors which extend along the axis of the boundary coordinate Xb or in the primary scanning direction, as a function of the run-data. The vector V2 is detected after the vector V1 accordingly. When the vector V2 is detected, specific data relating to the vector V2 is stored in the vector data memory 58 and the working buffer 56. Another vector V3 which extends along the boundary coordinate Yb or in the secondary scanning direction is detected as a function of the data for the vectors V1 and V2. The following steps (1) through (11) explain the registration of the specific data relating to the vector V2, the detection of the vector V3, and the registration of specific data concerned with the vector V3. Some of the symbols "(1)" through "(11)" indicating the following steps (1) through (11) are shown in the FIGS. 6(a) through 9(c) for further explanation. The arrows in those figures show either that one data is changed to the other data or that the data is used to point out some position.

Step (1): When the vector V2 is detected as shown in FIG. 6(a), the boundary coordinates (Xb, Yb) of a start point P3 and an end point P4 of the vector V2 are respectively stored at addresses *3 and *4 in the vector data memory 58 as shown in FIG. 6(c). Simultaneously, link data *4 representing linkage of the coordinate data (3,2) at the address *3 with the coordinate data (2,2) at the address *4 is registered at the address *3 in the vector data memory 58. Link data "NC" stored at the address *4 indicates that the coordinate data at the address *4 is not connected with any other address.

Step (2): As shown in FIG. 6(b), in the previous-register 56p, the boundary coordinate Xb=#3 of the start point P3 of the vector V2 is registered at prev[#2] corresponding to the boundary coordinate Xb=#2 of the end point P4 of the vector V2. In the next-register 56n, the boundary coordinate Xb=#2 of the end point P4 of the vector V2 is registered at next[#3] corresponding to the boundary coordinate Xb=#3 of the start point P3 of the vector V2.

Step (3): In the column-register 56c, the address *3 of the coordinate data (3,2) of the start point P3 is written at column[#3] corresponding to the boundary coordinate Xb=#3 of the start point P3 of the vector V2. When other data has already been registered at the position, new data is written over it.

Step (4): when the contour extraction unit 44 tries to writes the address *3 at the column[#3] during the step (3) to find out that address *2 is already registered at the position, the unit 44 identifies the linkage between the address *2 and the address *3 and stores the address *3 as the link data at the address *2 in the vector data memory 58 as shown in FIG. 6(c). Thus another vector V3 is detected between the points P2 and P3 (FIG. 6(a)), and a new vector sequence is made which consists of the three vectors V1, V3, and V2 connected in this order. The new vector sequence has a starting point which is the start point P1 of the vector V1, and a terminal point which is the end point P4 of the vector V2.

FIGS. 7(a) through 7(c) show the data stored in the vector data memory 58 and the working buffer 56 after execution of the steps (1) through (4) as well as the processing of the subsequent steps (5) through (8).

Step (5): At the completion of the step (4), both prey[#3] and next[#3] stores some data. This indicates that the points P2 and P3 at the boundary coordinate Xb=#3 are connected to another point before them and to still another point after them. In other words, the points P2 and P3 at the boundary coordinate Xb=#3 are intermediate points of the vector sequence. The contour extraction unit 44 then updates the registered data in the working buffer 56 corresponding to the boundary coordinate Xb=#3 according to the following steps (5) through (7). The updating of the registered data in the working buffer 56 will be hereinafter called "correspondence optimization process."

In the correspondence optimization process, the registered data in the next-register 56n are updated in the following manner. The contour extraction unit 44 first reads the boundary coordinate Xb=#1 stored at prev[#3] which corresponds to the coordinate data #3 under processing. The data #1 at prey[#3] indicates that the previous point connected to the points at the boundary coordinate Xb=#3 is located at the boundary coordinate Xb=#1. Referring to the coordinate #1, the extracting unit 44 reads the boundary coordinate Xb=#3 stored at next[#1]. The data #3 at next[#1] indicates that the next point connected to the points at the boundary coordinate Xb=#1 is located at the boundary coordinate Xb=#3. In order to eliminate the registered data concerning the intermediate points P2 and P3 from the working buffer 56, the registered data in the next-register 56n are to be updated such that they indicate that the point P4 is connected to the point P1. This updating is accomplished by rewriting the data at next[#1], which indicates the next point of the point P1, with the data #2 at next[#3], which indicates the next point of the points P2 and P3. Consequently, the data at next[#1] is changed to the coordinate data #2.

Step (6): Registered data in the previous-register 56p is updated in a similar manner. The contour extraction unit 44 first reads the data #2 at next[#3] corresponding to the boundary coordinate Xb=#3 of the intermediate points P2 and P3, and then reads the data #3 at prev[#2]. The data *3 at prev[#2] shows that the previous point of the points P2 and P3 is the point P4. In order to eliminate the data concerning the intermediate points P2 and P3 positioned at the boundary coordinate Xb=#3 from the working buffer 56, the data #1 at previa[#3] showing the boundary coordinate Xb of the previous point of the points P2 and P3 is stored at previa[#2] showing the boundary coordinate Xb of the previous point of the point P4.

Step (7): After updating the registered data in the previous-register 56p and the next-register 56n, the contour extraction unit 44 eliminates the registered data for the intermediate points P2 and P3 from the registers 56p, 56c, and 56n, that is, data at prev[#3], column[#3], and next[#3].

As described above, the correspondence optimization process according to the steps (5) through (7) updates the connection data stored in the previous-register 56p and the next-register 56n.

Step (8): In the column-register 56c, the address *4 of the coordinate data of the end point P4 is written at column[#2] corresponding to the boundary coordinate Xb=#2 of the end point P4. All the connection process following the detection of the vector V2 are thus completed.

Figure 8A:
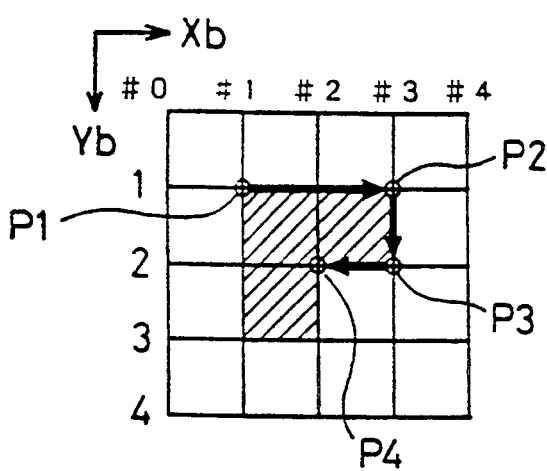
Figure 8C:
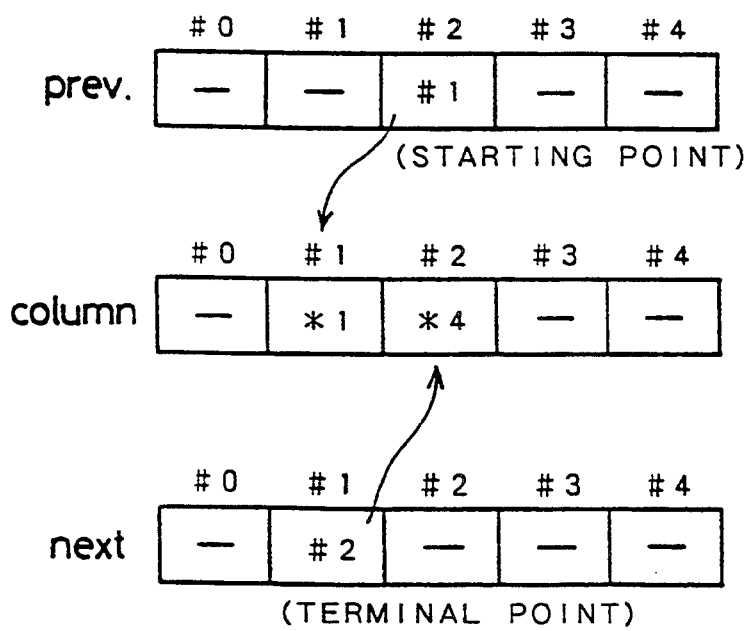

FIGS. 8(a) through 8(c) show the registered data after the step (8). The data #1 at prey[#2] suggests that the terminal point of the vector sequence is located at the boundary coordinate Xb=#2 and that the starting point of the vector sequence is located at the boundary coordinate Xb=#1. The data #2 at next[#1] indicates that the starting point of the vector sequence is located at the boundary coordinate Xb=#1 and that the terminal point of the vector sequence is located at the boundary coordinate Xb=#2. In the column-register 56c, the addresses *1 and *4 for the coordinate data of the starting point and the terminal point of the vector sequence are stored at the respective positions of the boundary coordinate Xb.

Figures 9A, 9B, 9C:
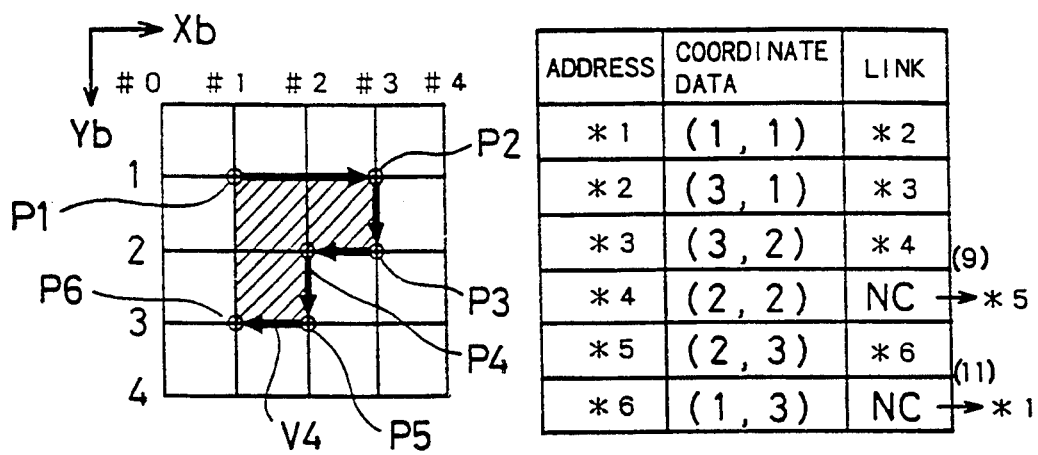
FIGS. 9(a) through 9(c) show linkage process subsequent to detection of each contour vector.

FIGS. 9(a) through 9(c) shows the processing when another vector V4 is further detected.

Step (9): When the vector V4 is detected coordinate data (2, 3) of a start point P5 and the same (1, 3) of an end point P6 of the vector V4 are respectively registered at addresses *5 and *6 in the vector data memory 58. Through the same process as the above step (3), link data showing connection of the point P5 at the address *5 with the point P6 at the address *6 is also registered in the memory 58. This results in a new vector sequence including the six points P1 through P6 which are connected in this order.

Step (10): According to the same process as the above step (4), specific data are written at prev[#1] and next[#2], respectively. In the previous-register 56p, boundary coordinate Xb=#2 of the start point P5 of the vector V4 is registered at prev[#1] corresponding to the boundary coordinate Xb=#1 of the end point P6 of the vector V4. In the next-register 56n, the boundary coordinate Xb=#1 of the end point P6 of the vector V4 is registered at next[#2] corresponding to the boundary coordinate Xb=#2 of the start point P5 of the vector V4.

The following expressions hold in this state:

$$\text{prey } [\#2] = \text{next } [\#2] \quad (\text{Ex1})$$

$$\text{prey } [\#1] = \text{next } [\#1] \quad (\text{Ex2})$$

Suppose that the boundary coordinate of a start point of a newly detected vector is Xs, and that the boundary coordinate of its end point is Xe, the above expressions (Ex1) and (Ex2) are rewritten as follows:

$$\text{prey } [Xs] = \text{next } [Xs] \quad (\text{Ex1}a)$$

$$\text{prev } [Xe] = \text{next } [Xe] \quad (\text{Ex2}a)$$

When the above expressions (Ex1a) and (Ex2a) hold both the start point and the end point of the newly detected vector can be a starting point of a new vector sequence as well as its terminal point. This indicates that the new vector sequence forms a closed-loop.

Step (11): When detecting that the expressions (EX1a) and (Ex2a) hold, the contour extraction unit 44 defines the start point P5 of the vector V4 as the starting point of the closed-loop vector sequence, and registers link data *1 at the address *6 showing that the coordinate data (1, 3) of the end point P6 of the vector V4 is connected to the coordinate data at the address *1. As a result, a closed-loop vector sequence including all the points P1 through P6 is formed which defines the contour of an image area.

The coordinate data of the closed-loop vector sequence which are registered in the vector data memory 58 are successively output according to the link data to external devices through the vector data output interface 74.

After a closed-loop vector sequence is formed and all the data of the vector sequence is output to the external devices, the boundary coordinates Xb of the start point and the end point which are lastly stored in the working buffer 56 are eliminated. Data of the closed-loop vectors are thereby completely erased.

The contents of the registered data in the working buffer 56 and the vector data memory 58 are summarized as follows:

a) Column-register 56c: The address of the coordinate data of the starting point of a vector sequence is stored at the position corresponding to the boundary coordinate Xb of the starting point. In similar manner, the address of the coordinate data of the terminal point in the vector sequence is stored at the position corresponding to the boundary coordinate Xb of the terminal point.

b) Previous-register 56p: The boundary coordinate Xb of the starting point of the vector sequence is written at the position corresponding to the boundary coordinate Xb of the terminal point.

c) Next-register 56n: The boundary coordinate Xb of the terminal point of the vector sequence is written at the position of the boundary coordinate Xb of the starting point.

d) Coordinate data in the vector data memory 58: This data shows the boundary coordinates (Xb, Yb) of start point or an end point of the detected vectors.

e) Link data: This data shows connection of the start point and the end points of the detected vectors.

By using the working buffer 56 and the vector data memory 58, whenever detecting a vector parallel to the axis of the boundary coordinate Xb, the contour extraction unit 44 can register specific data of a starting point and a terminal point of a new vector sequence and update the linkage of the points in the vector sequence. Furthermore, when the vector sequence forms a closed-loop, the contour extracting unit 44 can detect the closed-loop without delay. As described above in detail, the contour extracting apparatus detects vectors at each scanning line by processing run-data while outputting contour vector data of a closed-loop vector sequence to external devices immediately after the detection of the closed-loop. In other words, the contour extracting apparatus can detect a contour of an image area without processing image data for all the scanning lines of the image, but by processing image data for one scanning line after another.

E. Details of Linkage Process

Figure 10:
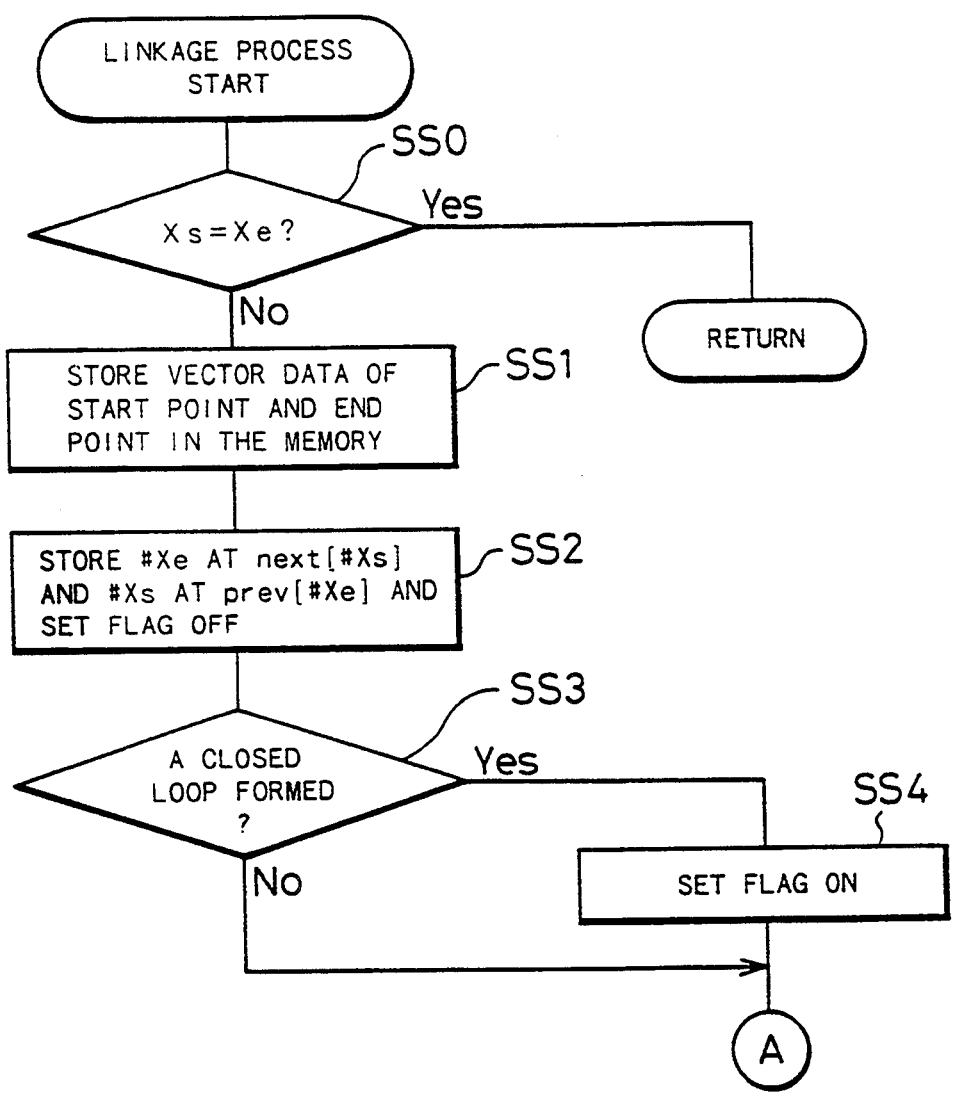
FIG. 10 is a flowchart showing details of the linkage process for connecting vectors.
Figure 11:
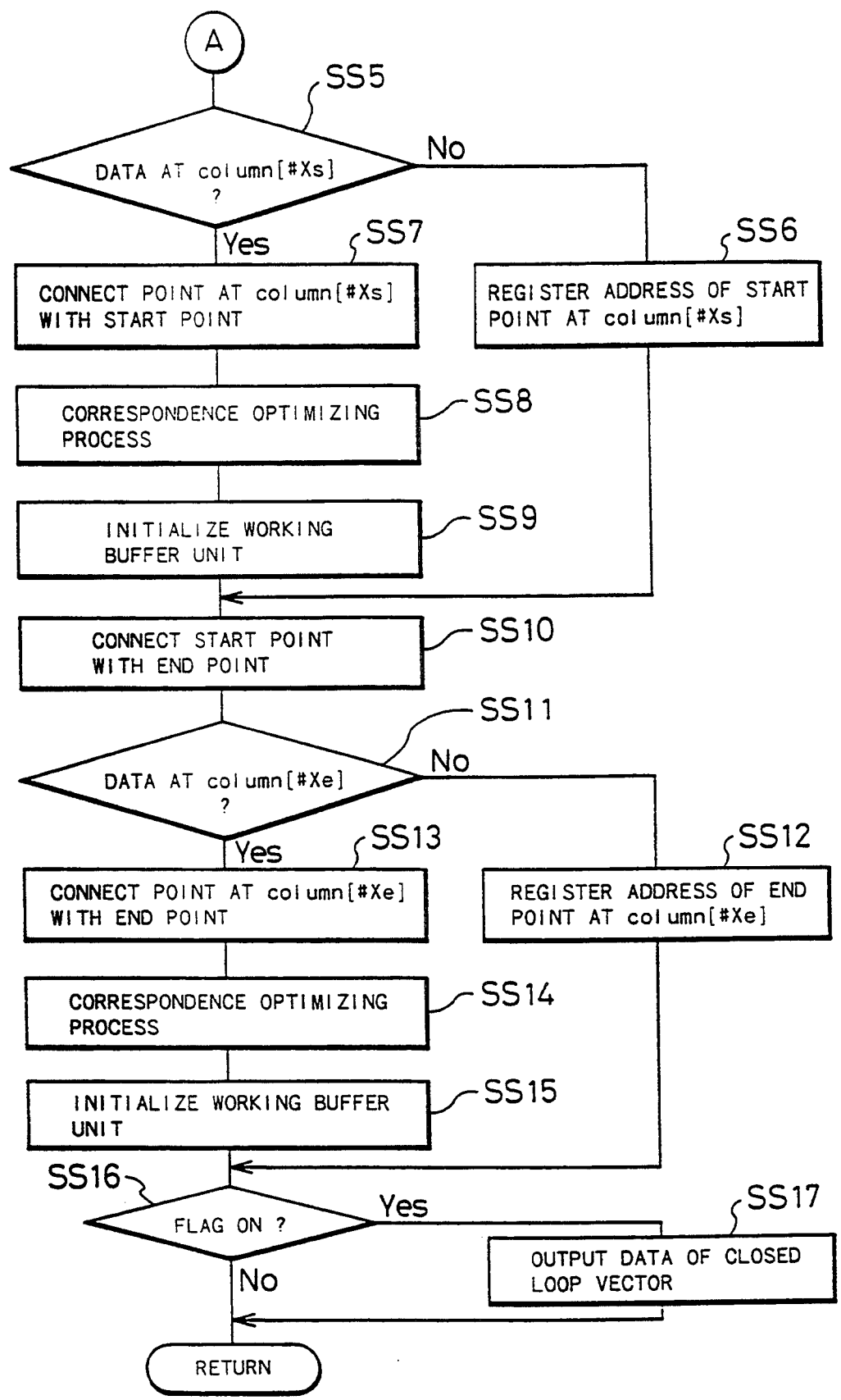
FIG. 11 is a flowchart showing details of the linkage process for connecting vectors.

FIGS. 10 and 11 are flowcharts showing the details of the linkage process of the vectors explained along with FIGS. 4(a) through 9(c).

At step SS0 X coordinate data Xs of a start point of a vector detected by the contour extraction unit 44 is compared with X coordinate data Xe of an end point of the vector. The program proceeds to step SS1 when Xs is not equal to Xe. Whereas the program quits the linkage process routine when Xs is equal to Xe. This is because no change is required in the current linkage state of the vector sequence when the X coordinate data Xs of the start point is equal to the X coordinate data Xe of the end point. The step SS0 effectively prevents conflict between linkage data in the registers of the working buffer 56.

At step SS1, coordinate data (Xs, Ys) of the start point and the same (Xe, Ye) of the end point for the detected vector are stored in the vector data memory 58. No link data has been registered yet at this stage.

At step SS2, coordinate data Xe and Xs are respectively stored at next[#Xs] and prev[#Xe], respectively, and a flag used in detecting a closed-loop is set OFF.

At step SS3, it is determined whether a vector sequence forms a closed-loop, that is, whether the above expressions (EX1a) and (Ex2a) hold.

When it is judged that the vector sequence forms a closed-loop at step SS3, the program proceeds to step SS4 at which the flag is set ON, and subsequently to step SS5 in FIG. 11. When the vector sequence does not form a closed-loop, the program directly goes from step SS3 to step SS5 in FIG. 11.

At step SS5, it is judged whether some data has already been registered at column[#Xs]. When there is no data at column[#Xs], the program goes to step SS6 at which the address of the coordinate data of the start point of the newly detected vector is written at column[#Xs]. The program then proceeds to step SS10 at which link data showing the connection of the coordinate data of the start point with the coordinate data of the end point is stored in the vector data memory 58.

When there is address data previously registered at column[#Xs] at step SS5, the program goes to step SS7. At step SS7, that link data is written in the vector data memory 58, which connects the point indicated by the address previously registered at column[#Xs] with the start point which is newly stored at SS1. In other words, the coordinate data stored in the memory 58 at the address at column[#Xs] is connected with the coordinate data of the start point stored at step SS1. This process corresponds to the step (4) explained above along with FIGS. 6(a) through 6(c).

At step SS8, the contour extraction unit 44 executes the correspondence optimization process in the working buffer 56, which corresponds to the processing of the steps (5) and (6) along with FIGS. 7(a) through 7(c). The program then goes to step SS9 to initialize the data to nil which are stored at the position corresponding to the boundary coordinate Xs of the starting point in the registers of the working buffer 56. This process corresponds to the step (7) along with FIGS. 7(a) through 7(c). At step SS10, the link data showing the connection of the coordinate data of the start point with the coordinate data of the end point is stored in the vector data memory 58.

Steps SS11 through SS15 are the same processing as steps SS5 through SS10, but they are for the end point of the vector.

At step SS16, it is judged whether the flag for identifying a closed-loop is ON or OFF. When the flag is OFF, the program immediately exits from the linkage process routine. When the flag is ON, on the other hand, the program goes to step SS17, at which the vector data of the closed-loop vector is output to external devices, and then concludes the processing. At step SS17, the coordinate data lastly registered in the vector data memory 58 is output first to the external devices, and the other coordinate data are successively output according to the link data. When the referred link data indicates the address of the coordinate data lastly registered, the contour extracting unit 44 stops the data output.

F. Details of Vector Detection Process

Figure 12:
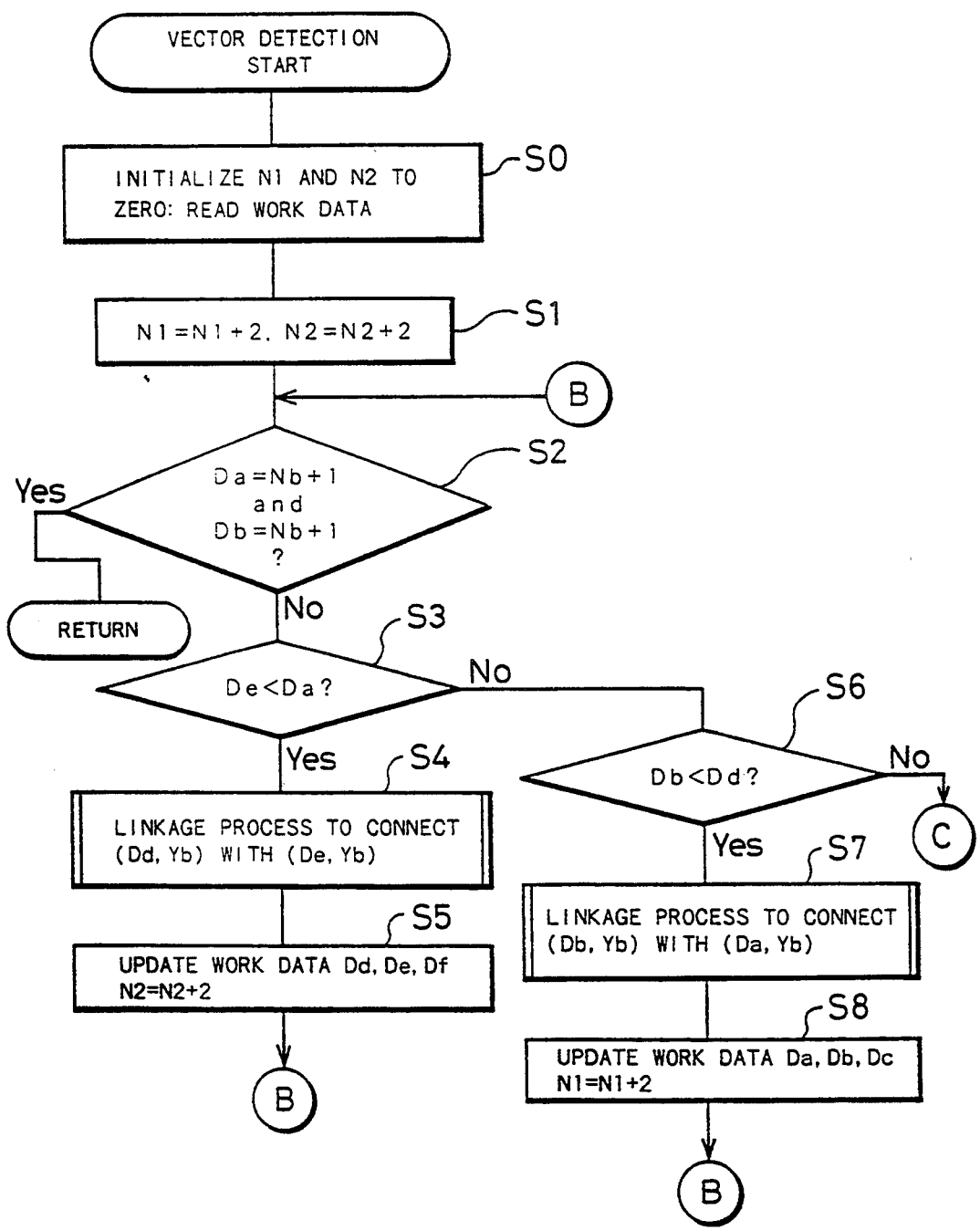
FIG. 12 is a flowchart showing steps of vector detection process.
Figure 13:
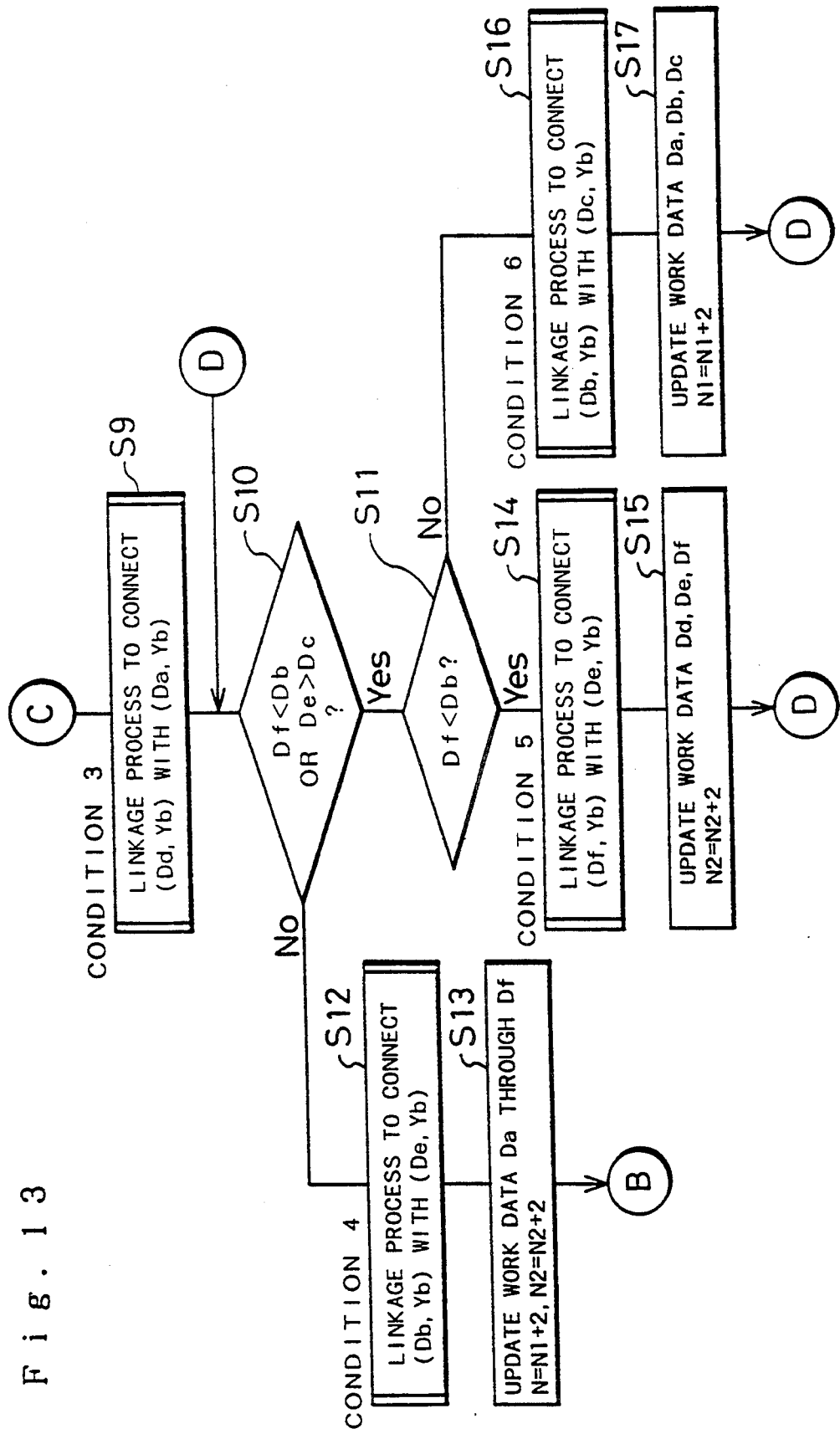
FIG. 13 is a flowchart showing steps of vector detection process.

FIGS. 12 and 13 are flowcharts showing the detailed steps of vector detection and the subsequent linkage process. The contour extraction unit 44 detects vectors as a function of run-data of two adjacent scanning lines stored in the run-data buffer 54.

When the program starts the vector detection routine at step S0, the following pointers N1 and N2 used in detecting vectors are initialized. FIGS. 14(a) through 14(c) illustrate the following pointers N1 and N2 and work data Da-Df.

First address pointer Ni: This pointer indicates an address in the first run-data buffer 81, and is initialized to zero at step S0.

Second address pointer N2: This pointer indicates an address in the second run-data buffer 82, and is initialized to zero at step S0.

Work data Da through Df: Da denotes run-data stored at the address indicated by the first address pointer N1 in the first run-data buffer 81, and Db and Dc denote run-data subsequent to Da. Dd denotes run-data stored at the address indicated by the second address pointer N2 in the second run-data buffer 82, and De and Df denote run-data subsequent to Dd. The work data Da through Df are stored in the main memory 50.

At step S1 shown in FIG. 12, the values of the address pointers N1 and N2 are respectively increased by two. This increment process implies that the addresses of the work data Da and Dd in the run-data buffers 81 and 82 are respectively updated by two as shown by the broken lines in FIGS. 14(a) and 14(b).

As explained previously along with FIGS. 4(a) and 4(b), the run-data at the address 0 in the run-data buffer 54 indicates the boundary coordinate Xb at which the image is changed from white to black. Since the value of the address pointer N1 is increased by two, the work data Da, Db, and Dc always indicate the positions of the changes from white to black, black to white, and white to black, respectively. The work data Dd, De, and Df indicate the same changes as the work data Da, Db, and Dc.

At step S2, the work data Da and Dd are respectively compared with the end data (Nb+1) which indicates the end of each scanning line. When the answer is YES at step S2, the program exits from the routine. On the contrary, when the answer is NO at step S2, the program proceeds to step S3 at which the two work data Da and De are compared with each other.

Figure 15:
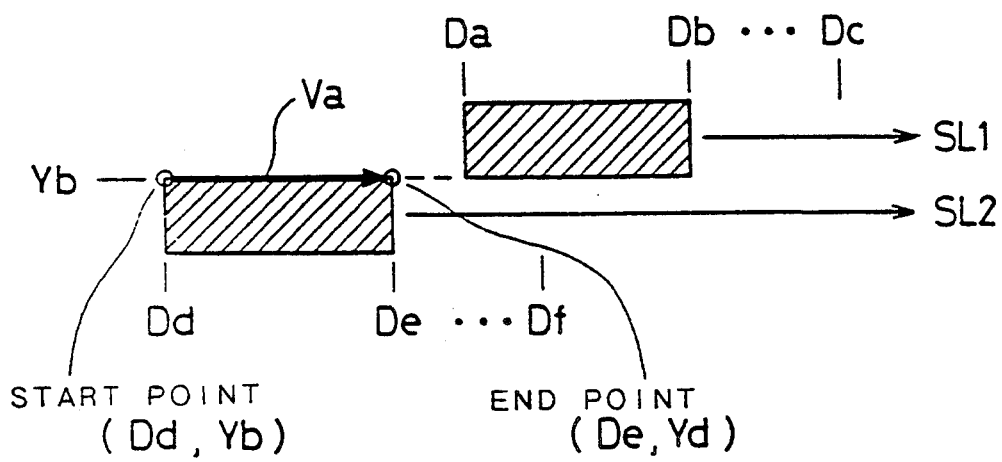
FIG. 15 is an explanatory view showing the configuration of image areas under Condition 1.

The program goes to step S4 when De is less than Da, while going to step S6 when De is not less than Da. FIG. 15 illustrates the image fragments when step S4 is to be executed. The work data Da, Db, and Dc define an image fragment along a first scanning line SL1, and the work data Dd, De, and Df along a second scanning line SL2. The condition that De is less than Da will be hereinafter referred to as 'Condition 1'. In FIG. 15, Yb denotes a boundary coordinate in the secondary scanning direction between the first and the second scanning lines SL1 and SL2.

Since the work data Da, Db, and Dc always indicate the positions of the changes from white to black, black to white, and white to black, respectively, as mentioned above, an image area between the positions indicated by the work data Da and Db is always black, and another image area between the positions indicated by the work data Db and Dc is white. In a similar manner, an image area between the positions indicated by the work data Dd and De is always black and another image area between the positions indicated by the work data De and Df is white.

As clearly shown in FIG. 15, when De is less than Da, or under Condition 1, a vector Va extending from a point (Dd, Yb) to another point (De, Yb) is on the upper boundary of a black image area. At step S4, the contour extraction unit 44 executes the linkage process according to the steps shown in FIGS. 10 and 11 to thereby connect the point (Dd, Yb) with the point (De, Yb), and registers specific data concerning the vector Va in the working buffer 56 and the vector data memory 58.

After the linkage process is executed at step the program proceeds to step S5 at which the work data Dd, De, and Df are updated and the second address pointer N2 is increased by two, and returns to step S2.

Figure 16:
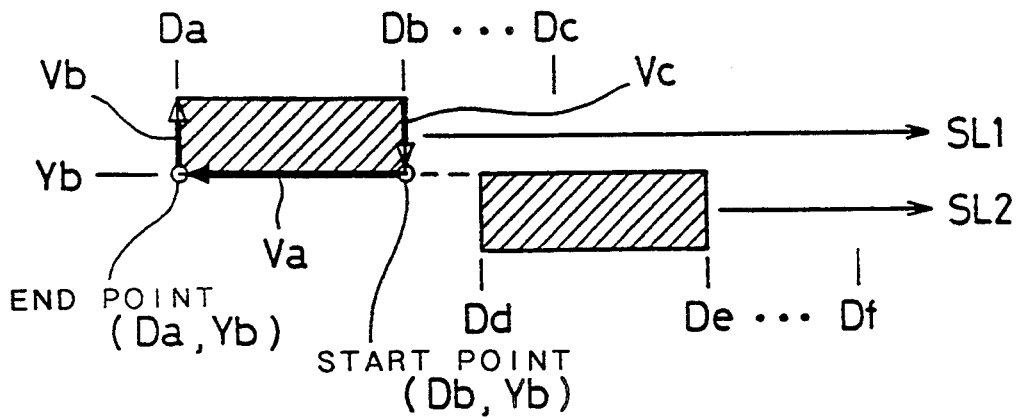
FIG. 16 is an explanatory view showing the configuration of image areas under Condition 2.

When De is not less than Da at step S3, the program goes to step S6 at which the work data Db is compared with the work data Dd. The program proceeds to step S7 when Db is less than Dd, while going to step S9 of FIG. 13 when Db is not less than Dd. FIG. 16 illustrates the image fragments under Condition 2 where step S7 is to be executed.

As shown in FIG. 16, Condition 2 is expressed as follows:

$$Da \leq De \text{ and } Db < Dd \tag{Ex3}$$

Under Condition 2, a vector Va extending from a point (Db, Yb) to another point (Da, Yb) is on the lower boundary of a black image area. At step S7, the contour extraction unit 44 executes the linkage process to connect the point (Db, Yb) with the point (Da, Yb), and registers specific data concerning the vector Va in the working buffer 56 and the vector data memory 58. The extracting unit 44 also executes the linkage process and registers specific data concerning a vector Vb extending upward from the point (Da, Yb) and another vector Vc extending downward to the point (Db, Yb).

After the linkage process is executed at step S7, the program proceeds to step S8 at which the work data Da, Db, and Dc are updated and the first address pointer N1 is increased by two, and returns to step S2.

When Db is not less than Dd at step S6, which state is referred to as 'Condition 3', the image fragments are in one of four states shown in FIGS. 17(a), 17(b), 18, and 19.

Condition 3 is expressed as:

$$Da \leq De \text{ and } Dd \leq Db \tag{Ex4}$$

In any of the four states under Condition 3, the contour extraction unit 4 executes the linkage process to connect one point (Dd, Yb) with another point (Da, Yb) as a vector Va at step S9 of FIG. 13, and registers specific data concerning the vector Va in the working buffer 56 and the vector data memory 58. The extracting unit 44 also executes the linkage process and registers specific data concerning a vector Vb extending upward from the point (Da, Yb).

At steps S10 and S11, the work data Df is compared with Db, and the work data De with Dc. Based on the results of the comparison, the above four states are classified into three conditions: that is, Condition 4 corresponding to step S12 and FIGS. 17(a) and 17(b); Condition 5 corresponding to step S14 and FIG. 18; and Condition 6 corresponding to step S16 and FIG. 19.

Figure 17A:
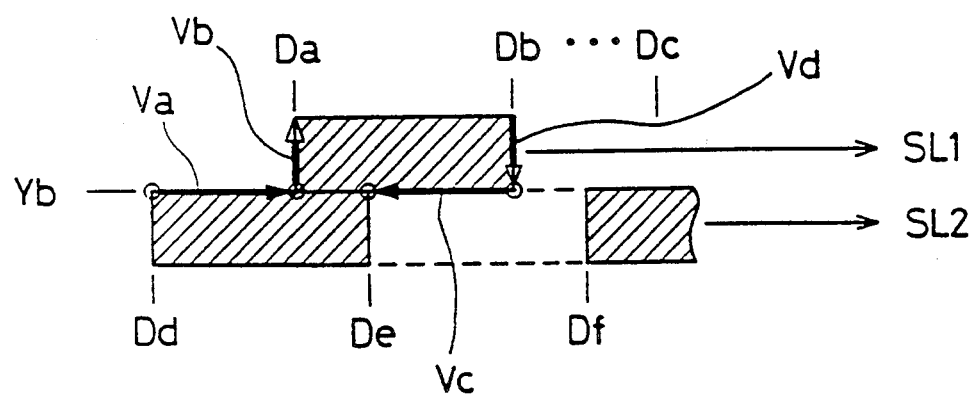
FIGS. 17(a) and 17(b) are explanatory views showing the configuration of image areas under Conditions 3 and 4.
Figure 17B:
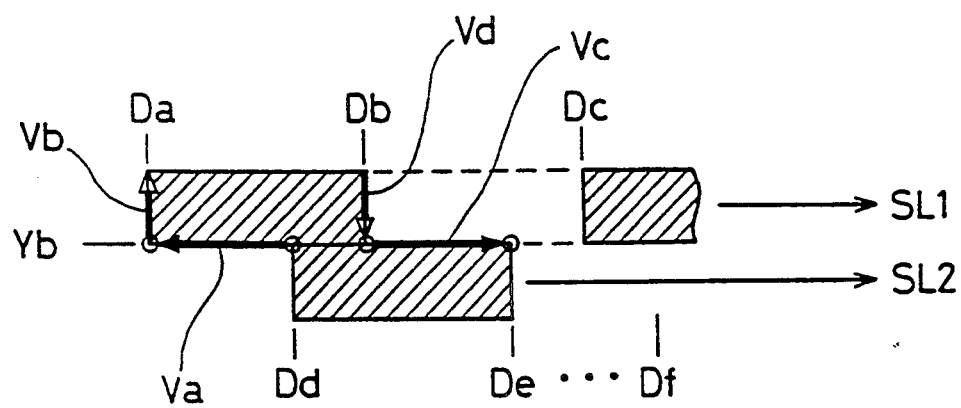

As shown in FIGS. 17(a) and 17(b), step S12 is executed when both Condition 3 and Condition 4 are met. Condition 4 is expressed as follows:

$$Db \leq Df \text{ and } De \leq Dc \tag{Ex5}$$

Condition 4 holds in the state shown either in FIG. 17(a) or FIG. 17(b). Under Condition 4, the contour extraction unit 4 executes the linkage process to connect one point (Db, Yb) with another point (De, Yb) as a vector Vc at step S12, and registers specific data concerning the vector Vc in the working buffer 56 and the vector data memory 58. The extracting unit 44 also executes the linkage process and registers specific data concerning a vector Vd extending downward to the point (Db, Yb). After the linkage process is executed at step S12, the program proceeds to step S13 at which all the work data Da through Df are updated and both the first and second address pointers N1 and N2 are increased by two, and returns to step S2.

Figure 18:
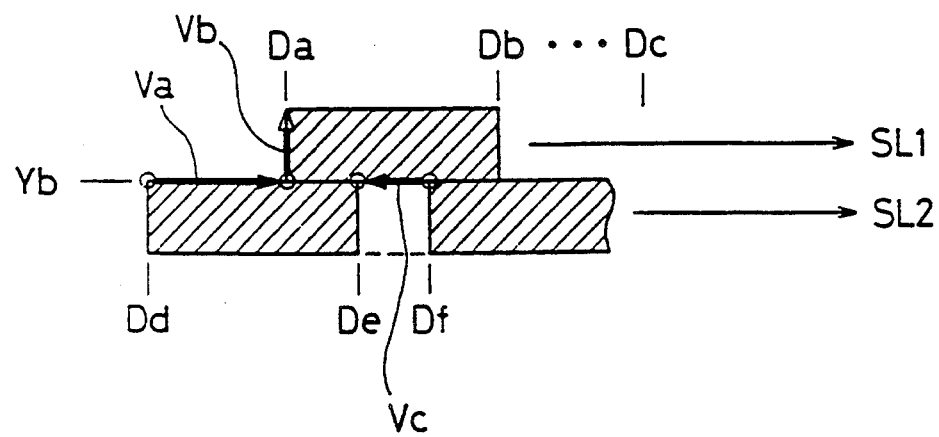
FIG. 18 is an explanatory view showing the configuration of image areas under Conditions 3 and 5.

As shown in FIG. 18, step S14 is executed when both Condition 3 and Condition 5 are met. Condition 5 is expressed as:

$$Df < Db \tag{Ex6}$$

The contour extraction unit 44 executes the linkage process to connect one point (Df, Yb) with another point (De, Yb) as a vector Vc at step S14, and registers specific data concerning the vector Vc in the working buffer 56 and the vector data memory 58. After the linkage process is executed at step S14, the program proceeds to step S15 at which the work data Dd, De, and Df are updated and the second address pointer N2 is increased by two, and returns to step S10.

Figure 19:
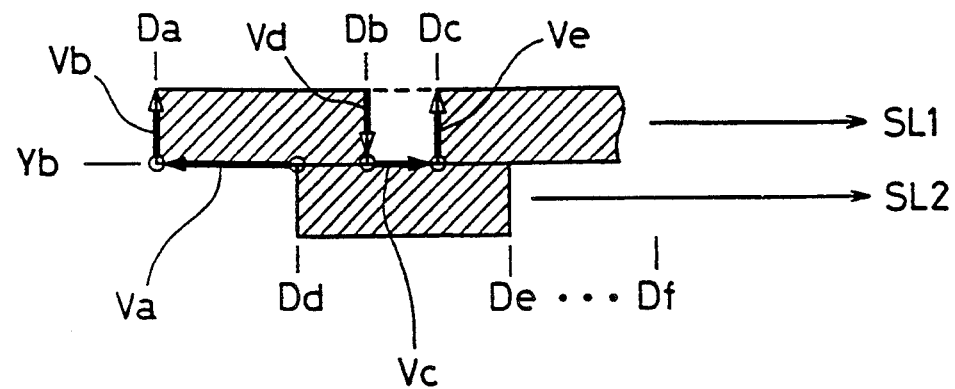
FIG. 19 is an explanatory view showing the configuration of image areas under Conditions 3 and 6.

As shown in FIG. 19, step S16 is executed when both Condition 3 and Condition 6 are met. Condition 6 is expressed as:

$$Dc < De \tag{Ex7}$$

The contour extraction unit 44 executes the linkage process to connect one point (Db, Yb) with another point (Dc, Yb) as a vector Vc at step S16, and registers specific data concerning the vector Vc in the working buffer 56 and the vector data memory 58. The extracting unit 44 also executes the linkage process and registers specific data concerning a vector Vd extending downward to the point (Db, Yb) and another vector Ve extending upward from the point (Dc, Yb). After the linkage process is executed at step S16, the program proceeds to step S17 at which the work data Da, Db, and Dc are updated and the first address pointer N1 is increased by two, and returns to step S10.

Under either Condition 5 or Condition 6, the program returns to step S10 and repeats the linkage process and updating of the work data until Condition 4 is met. When Condition 4 holds at step S10, the program goes to step S12 for executing process under Condition 4, and returns to step S2.

As described above in detail, the contour-extracting apparatus detects contour vectors on the boundary between two adjacent scanning lines as a function of run-data of the two scanning lines stored in the run-data buffer 54.

The method of extracting vectors as a function of run-data of two scanning lines is also described in "An Improved Algorithm for the Sequential Extraction of Boundaries from a Raster Scan" (David W. Capason, COMPUTER VISION, GRAPHICS, AND IMAGE PROCESSING, Vol. 28, 109–125, 1984), and UK Patent GB 2,201,562A mentioned above.

G. Overall Processing Procedure

Figure 20:
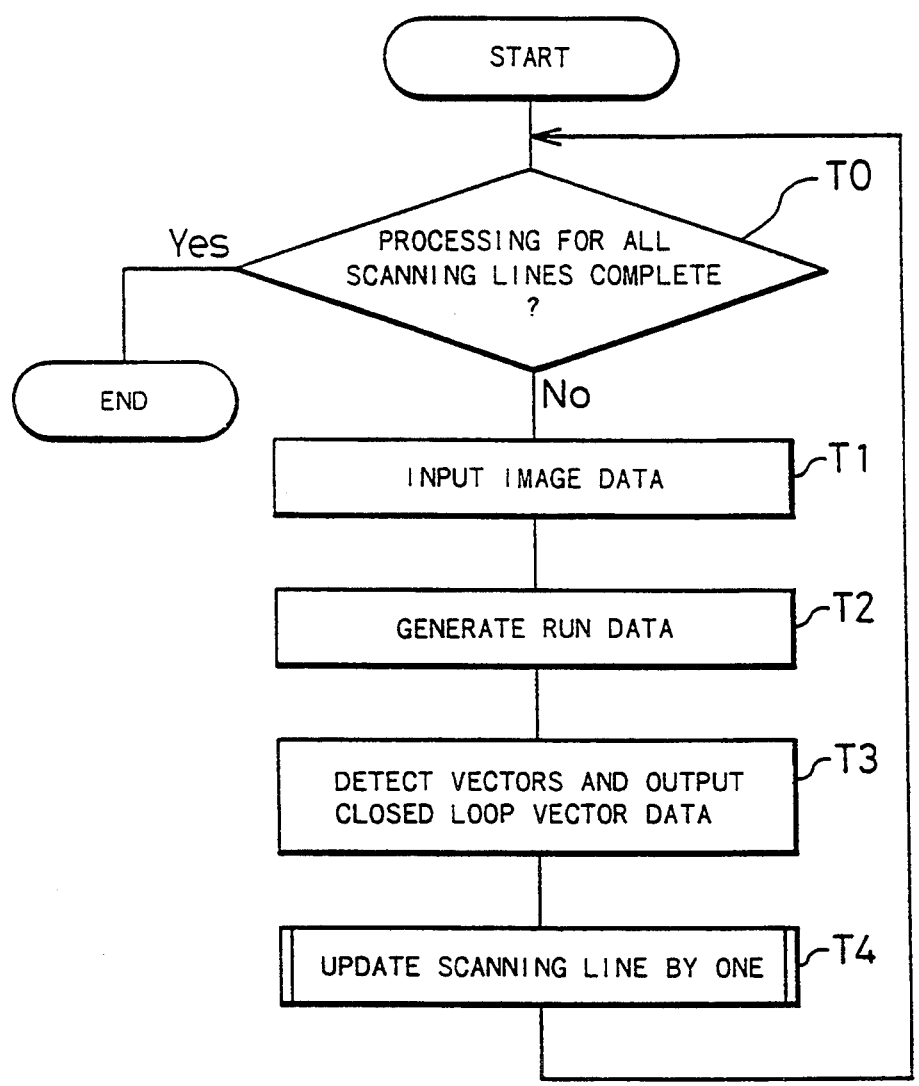
FIG. 20 is a flowchart showing steps of the whole processing in the embodiment.

FIG. 20 is a flowchart showing the overall processing in the embodiment.

When the program starts, it is judged whether the processing is completed for all the scanning lines on an image to be processed at step T0. When the answer is NO at step T0, the program proceeds to step T1 at which image data of one scanning line is input into the image data buffer 52.

At step T2, the input image data is converted to run-data. Since run-data of two scanning lines are stored together in the run-data buffer 54 as explained above, the run-data for the first scanning line is converted at step T2, and then the program skids steps T3, T4, T0, and T1 and returns to step T2 to generate the run-data of the second scanning line. In general run-data of the N-th scanning line is stored in the second run-data buffer 82 while run-data of the (N-1)-th scanning line is stored in the first run-data buffer 81.

At step T3, vectors are detected according to the steps shown in FIGS. 12 and 13, and the detected vectors are linked with one another according to the steps shown in FIGS. 10 and 11. When a closed-loop vector is detected in the linkage process, data specifying the closed-loop vector is output at step T3.

The program then goes to step T4 at which the set of two adjacent scanning lines to be processed is updated by one scanning line, and repeats steps T0 through T4.

FIGS. 21(a) through 29(d) are explanatory views illustrating an example where contour vectors are detected according to the above method. In the figures, the whole image consists of 8×8 pixels, and includes three black image areas R1, R2, and R3. Each set of four figures, such as FIGS. 21(a) through 21(d), illustrate the result of the processing executed for one scanning line running through the pixel boundary according to the procedure shown in FIG. 20. A scanning line running on the pixel boundary will be herein after referred to as "boundary scanning line", and a scanning line running on the pixel centers will be referred to as "pixel scanning line". The run-data of a pixel scanning line above the current boundary scanning line is stored in the first run buffer 81 while the run-data of a pixel scanning line below the current boundary scanning line is stored in the second run buffer 82.

In FIGS. 21(a) through 21(d), the run-data of a pixel scanning line below the boundary scanning line at Yb=0, that is, the run-data representing an image segment of the uppermost pixel scanning line shown in FIG. 21(a), is stored in the second run-data buffer 82. Since there is no black area on this pixel scanning line, only the end data representing the end of the run-data (shown with 'e' in FIG. 21(b)) is stored in the second run-data buffer 82. In the state shown in FIGS. 21(a) through 21(d), there is no vector detected on the boundary scanning line at Y1=0, and no data is thus registered in either the working buffer 56 or the vector data memory 58.

As shown in FIGS. 22(a) through 22(d), three vectors are detected on the boundary scanning line at Yb=1. Coordinate data of a start point and an end point of each of the three vectors are stored in the vector data memory 58 as well as its link data. Data on the start and end points of these three vectors are also registered in the working buffer 56.

Figures 23A, 23B, 23C, 23D:
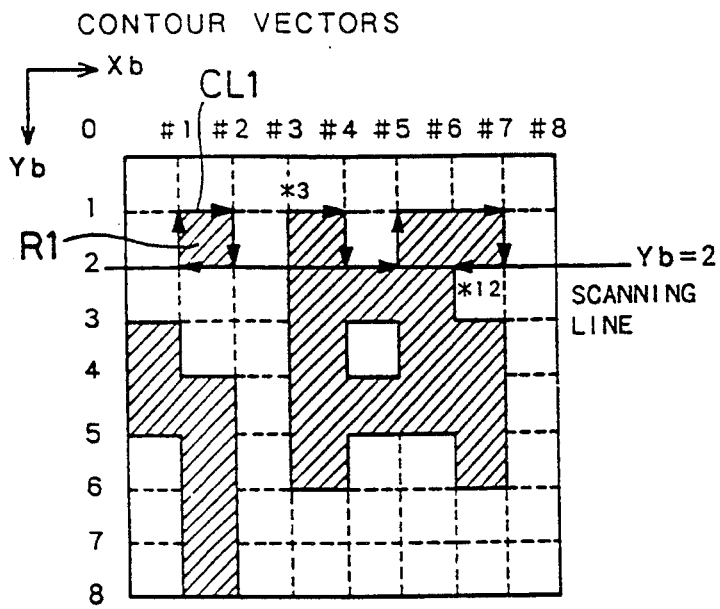
FIGS. 23 (a) through 23 (d) show a process for extracting contour vectors along each boundary scanning line.

In FIGS. 23(a) through 23(d), three other horizontal vectors are detected along the boundary scanning line at Yb=2 and vectors along the axis of the boundary coordinate Yb, that is. Five vertical vectors extending vertically in FIG. 23(a) are also detected to be linked with the horizontal vectors. A closed-loop vector CL1 of the black image area R1 is formed by connecting the coordinate data stored at addresses *1, *2, *7, and *8 in the vector data memory 58 of FIG. 23(d). Data specifying the closed-loop vector CL1 is then output to external devices, and they are eliminated from the working buffer 56 and the vector data memory 58.

In FIGS. 24(a) through 24(d), three other horizontal vectors are detected along the boundary scanning line at Yb=3 and connected with the vectors previously detected.

In FIGS. 25(a) through 25(d), a closed-loop vector CL2 defining the contour of a white image area W2 surrounded by the black image area R2 is formed, and data specifying the closed-loop vector CL2 is output to the external devices.

In the similar manners, two other horizontal vectors are detected in FIGS. 26(a) through 26(d), and a closed-loop vector CL3 defining the contour of the black image area R2 is formed and output to the external devices in FIGS. 27(a) through 27(d). No vectors are newly detected in FIGS. 28 (a) through 28 (d). Another closed-loop vector CL4 defining the contour of the black image area R3 is formed and output to the external devices in FIGS. 29(a) through 29(d).

Figures 25A, 25B, 25C, 25D:
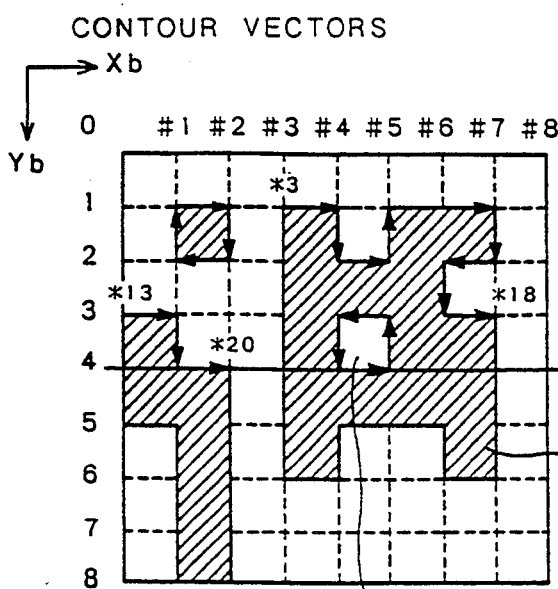
FIGS. 25(a) through 25(d) show a process for extracting contour vectors along each boundary scanning line.
Figures 26A, 26B, 26C, 26D:
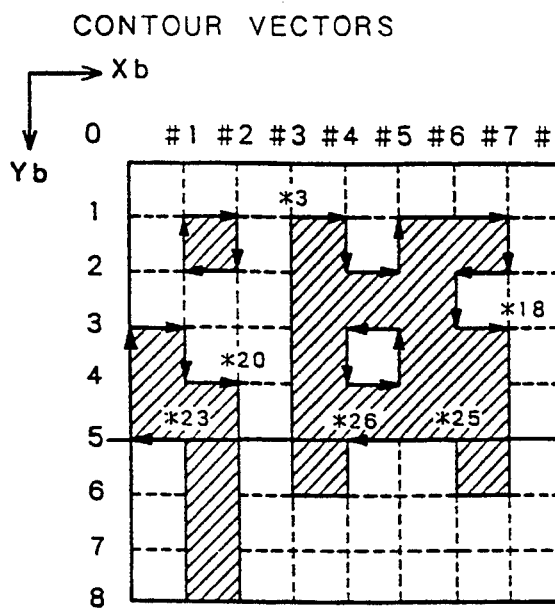
FIGS. 26(a) through 26(d) show a process for extracting contour vectors along each boundary scanning line.
Figures 27A, 27B, 27C, 27D:
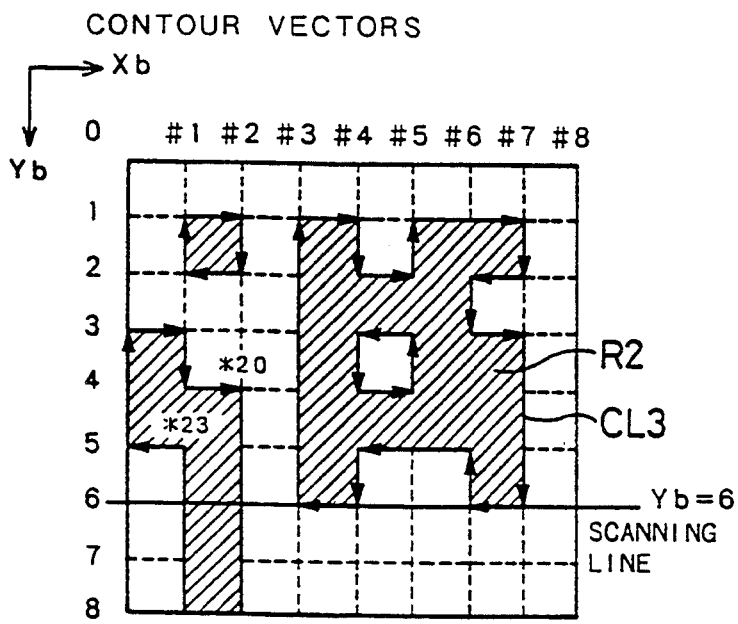
FIGS. 27(a) through 27(d) show a process for extracting contour vectors along each boundary scanning line.
Figures 28A, 28B, 28C, 28D:
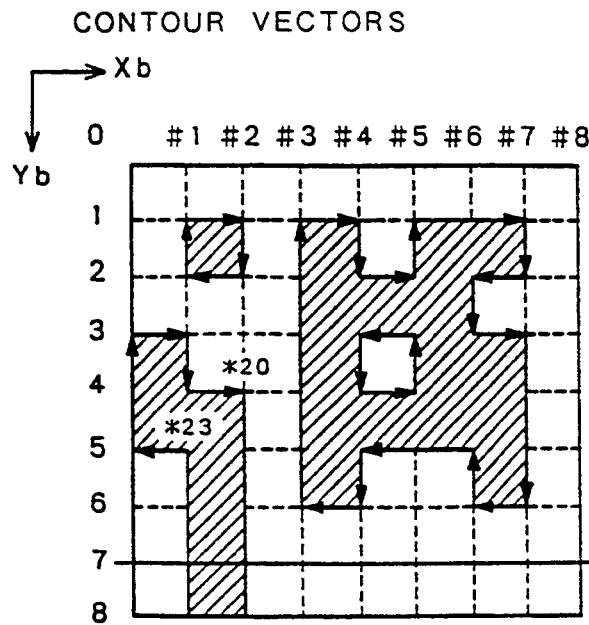
FIGS. 28(a) through 28(d) show a process for extracting contour vectors along each boundary scanning line.
Figures 29A, 29D:
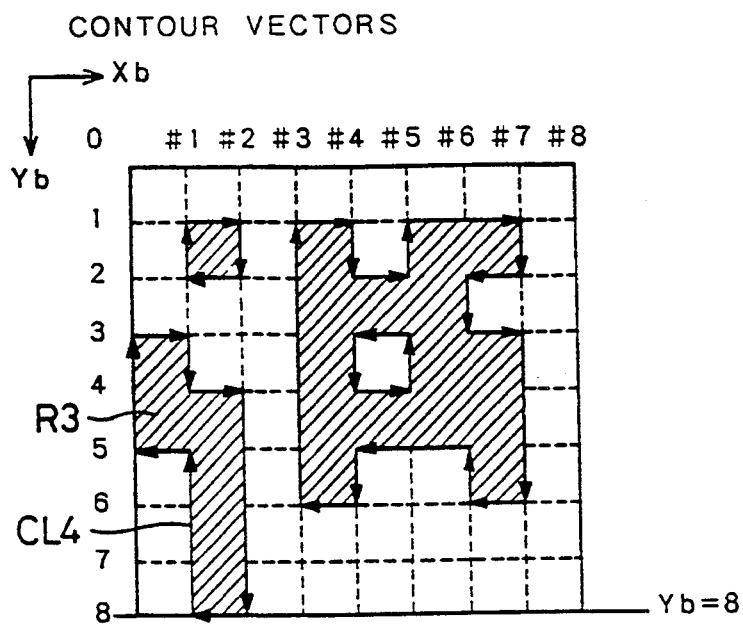

As clearly shown in FIGS. 24(a), 25(a), and 26(a), when the whole image includes plural image areas (black image areas R1 through R3 and white image area W1 in this example), plural sets of vector sequence are registered in the working buffer 56 and the vector data memory 58. Under such conditions, however, the value of the boundary coordinate Xb of a starting point of a certain vector sequence is not identical with the boundary coordinate Xb of a starting point or a terminal point of another vector sequence. Similarly, the boundary coordinate Xb of a terminal point of a certain vector sequence is not identical with the coordinate of a starting point or a terminal point of another vector sequence. This can be attributed to the following reason. When the boundary coordinate Xb of a starting point or a terminal point of a first vector sequence is identical with the boundary coordinate Xb of a starting point or a terminal point of a second vector sequence, the first and the second vector sequences are connected vertically with each other at that boundary coordinate Xb to form a single connected vector sequence.

Taking into account of such characteristics about the points of vector sequences, each of the registers 56p, 56c, and 56n in the working buffer 56 is only required to store one piece of data corresponding to each boundary coordinate Xb. When a boundary coordinate Xb of a starting point or a terminal point of a first vector sequence is identical with another boundary coordinate Xb of a starting point or a terminal point of a second vector sequence, all the three registers 56p, 56c, and 56n is provided with specific data at the identical boundary coordinate Xb. This allows to identify the identical boundary coordinate Xb to be of an intermediate point in a single vector sequence, and the first vector sequence is linked with the second vector sequence. This processing is the correspondence optimization process described in detail along with FIGS. 7(a) through 7(c). When the above expressions (EX1a) and (Ex1b) hold, a closed-loop vector is detected.

A significant feature of the contour-extracting apparatus of the embodiment is that the working buffer 56 allows to detect a closed-loop of contour vectors while successively updating the boundary scanning line to be processed one by one.

As described above, the contour extracting apparatus successively processes the run-data along one boundary scanning line, or along two pixel scanning lines, and detects closed-loop vectors defining the contour of image areas without processing all of the run-data for the whole image. The contour-extracting apparatus allows the other apparatus or devices to execute other processing on the image areas defined by the detected closed-loop vectors while the contour extracting apparatus is extracting the closed-loop vectors. The whole image can be therefore efficiently processed in relatively a short time.

H. Modifications

The present invention is not restricted to the above embodiment, but can be changed, altered, and modified to various applications without departing from the scope of the present invention. Some examples of modification are given below.

(1) The present invention is applicable to multi-tone images as well as black-and-white binary images described in the above embodiment. In extracting a contour in a multi-tone image, multi-tone image data is first compared with a threshold value to be converted to binary image data by the binary image production unit 46 (FIG. 2). The binary image data is then converted to run-data by the run-data conversion unit 42.

(2) The working buffer 56 can have any structure other than the above three registers 56p, 56c, and 56n as long as it includes registers for storing data representing the relationship between a starting point and a terminal point of each vector sequence.

(3) Vacant spaces of the vector data memory 58 can be managed to be used more effectively. FIG. 30 shows a method of managing vacant spaces in the vector data memory 58. In the state of FIG. 30, the data previously registered at addresses *1, *2, *7, and *8 have already been output as closed-loop vector data, whereby these addresses are now vacant. Under such a state, a vacancy address pointer BAP is used to indicate the address *1 of the first vacant space, thus allowing vector data which is newly detected to be stored in the vacant spaces. The address of the next vacant space is written as link data at each address of the vacant space; for example, the address *2 of the second vacant space is registered as the link data for the address *1; and the address -7 of the third vacant space is registered as the link data for the address *2. The vacancy address pointer BAP thus allows effective use of vacant spaces in the vector data memory 58.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of extracting a closed-loop contour of an image part in a binary image including a plurality of pixels, said closed-loop contour being expressed by a vector sequence including a plurality of contour vectors each connecting vertices of said closed-loop contour, each said vertex being defined by boundary coordinates (Xb, Yb) indicating a position at a boundary between pixels, said method comprising the steps of:

(a) preparing binary image data representing said binary image, and storing said binary image data in an image memory;
  (b) selecting two adjacent scanning lines parallel to an axis of the boundary coordinate Xb;
  (c) converting said binary image data for said selected two adjacent scanning lines into two sets of run-data, and storing said two sets of run-data in a run-data memory, each said run-data expressing boundary positions at which the binary level of said binary image data changes, each said boundary position being expressed by said boundary coordinate Xb;
  (d) comparing said two sets of run-data with each other to detect a first Xb-vector, said first Xb-vector being one of said plurality of contour vectors and extending along the axis of said boundary coordinate Xb between said selected two adjacent scanning lines, to thereby store coordinate data of a start point and an end point of said first Xb-vector in a vector data memory; detecting a Yb-vector extending in the axis of said boundary coordinate Yb as a result of said comparison, said Yb-vector being one of said plurality of contour vectors and connecting said first Xb-vector with a second detected Xb-vector to thereby store coordinate data representing a start point and an end point of said Yb-vector in said vector data memory, and generating link data indicating connection among said Yb-vector, said first Xb-vector and said second Xb-vector to form a vector sequence, and storing said link data in said vector data memory; and detecting a closed-loop contour represented by said vector sequence;
  (e) producing closed-loop vector data representing said closed-loop contour; and
  (f) repeating said steps (b) through (e) while updating said two adjacent scanning lines by one scanning line at a time, to thereby extract at least one closed-loop contour in said binary image, wherein said step (d) comprises the steps of:
  (d-1) producing correspondence data representing a positional relationship between a starting point and a terminal point of said vector sequence, to store said correspondence data in a data register; and
  (d-2) identifying said vector sequence as that representing a closed-loop contour when said correspondence data of said vector sequence indicates that said starting point and said terminal point of said vector sequence are identical with each other, and wherein said data register comprises a first register for storing a first address value of said vector data memory, at which said coordinate data of said starting point of said vector sequence is stored, at a position in said first register corresponding to the boundary coordinate value Xb of said starting point, and a second address value of said vector data memory, at which said coordinate data for said terminal point of said vector sequence is stored, at a position in said first register corresponding to the boundary coordinate value Xb of said terminal point; a second register for storing the boundary coordinate value Xb of said starting point of said vector sequence at a position in said second register corresponding to the boundary coordinate value Xb of said terminal point of said vector sequence; and a third register for storing the boundary coordinate value Xb of said terminal point of said vector sequence at a position in said third register corresponding to the boundary coordinate value Xb of said starting point of said vector sequence.

2. A method in accordance with claim 1, wherein said step (d) further comprises the step of:
  (d-3) storing vector data of said first Xb-vector in said vector data memory, said vector data including coordinate data (Xs, Ys) of the start point of said first Xb-vector, coordinate data (Xe, Ye) of the end point of said first Xb-vector, and link data indicating connection between said start point with said end point; and said step (d-1) comprises the step of:
  (g) storing address values of said vector data for said start point and said end point of said first Xb-vector, which vector data are stored in said vector data memory in said step (d-3), at respective positions in said first register corresponding to the boundary coordinate value Xs of said start point and the boundary coordinate value Xe of said end point, respectively, and storing the boundary coordinate value Xs of said start point at a position in said second register corresponding to the boundary coordinate value Xe of said end point; and storing the boundary coordinate value Xe of said end point at a position in said third register corresponding to the boundary coordinate value Xs of said start point; and said step (d-2) further comprising the steps of:

(h) detecting said Yb-vector as a function of registered data in said first register, storing said link data for said detected Yb-vector in said vector data memory, updating registered data in said second register and said third register related to said starting point and said terminal point of said vector sequence including said detected Yb-vector, and eliminating data related to the start point and the end point of said detected Yb-vector stored in said first, second and third registers, to thereby connect said detected Yb-vector successively with said first Xb-vector and said second Xb-vector; and (i) identifying said vector sequence as that representing a closed-loop contour under the conditions that the coordinate value stored at a position in said second register corresponding to said boundary coordinate value Xs of said start point is identical with the coordinate value stored at a position in said third register corresponding to said boundary coordinate value Xs of said start point and that the coordinate value stored at a position in said second register corresponding to said boundary coordinate value Xe of said end point is identical with the coordinate value stored at a position in said third register corresponding to said boundary coordinate value Xe.

3. A method in accordance with claim 1, wherein said step (a) comprises the step of:

(j) preparing multi-tone image data representing a multi-tone image, and converting said multi-tone image data into said binary image data with a predetermined threshold value.

4. A method in accordance with claim 1, wherein said step (d) comprises the step of:

(k) comparing coordinate values of three consecutive boundary positions indicated by the first set of said run-data and coordinate values of three consecutive boundary positions indicated by the second set of said run-data, to thereby detect said first Xb-vector and said Yb-vector.

5. A contour extracting apparatus for extracting a closed-loop contour of an image part in a binary image including a plurality of pixels, said closed-loop contour being expressed by a vector sequence including a plurality of contour vectors each connecting vertices of said closed-loop contour, each said vertex being defined by boundary coordinates (Xb, Yb) indicating a position at a boundary between pixels, said apparatus comprising:

a binary image memory for storing binary image data representing said binary image;

run-data conversion means for selecting two adjacent scanning lines parallel to an axis of the boundary coordinate Xb, converting said binary image data for said selected two adjacent scanning lines into two sets of run-data, each said run-data expressing boundary positions at which the binary level of said binary image data changes, each said boundary position being expressed by said boundary coordinate Xb;

a run-data memory for storing said two sets of a vector data memory;

contour extraction means comprising:

means for comparing said two sets of run-data with each other to detect a first Xb-vector, said first Xb-vector being one of said plurality of contour vectors and extending along the axis of said boundary coordinate Xb between said selected two adjacent scanning lines;

means for writing coordinate data of a start point and an end point of said first Xb-vector in said vector data memory;

means for detecting a Yb-vector extending in the axis of said boundary coordinate Yb as a result of said comparison, said Yb-vector being one of said plurality of contour vectors and connecting said first Xb-vector with a second detected Xb-vector to thereby write coordinate data representing a start point and an end point of said Yb-vector in said vector data memory, and generating link data indicating connection among said Yb-vector, said first Xb-vector, and said second Xb-vector to form a vector sequence, and writing said link data in said vector data memory; and means for detecting a closed-loop contour represented by said vector sequence; and producing closed-loop vector data representing said closed-loop contour, and a data register, wherein said contour extraction means comprises:

first means for producing correspondence data representing a positional relationship between a starting point and a terminal point of said vector sequence, to store said correspondence data in said data register; and second means for identifying said vector sequence as that representing a closed-loop contour when said correspondence data of said vector sequence indicates that said starting point and said terminal point of said vector sequence are identical with each other, wherein said data register comprises:

a first register for storing a first address value of said vector data memory, at which said coordinate data of said starting point of said vector sequence is stored, at a position in said first register corresponding to the boundary coordinate value Xb of said starting point, and a second address value of said vector data memory, at which said coordinate data for said terminal point of said vector sequence is stored, at a position in said first register corresponding to the boundary coordinate value Xb of said terminal point;

a second register for storing the boundary coordinate value Xb of said starting point of said vector sequence at a position in said second register corresponding to the boundary coordinate value Xb of said terminal point of said vector sequence; and a third register for storing the boundary coordinate value Xb of said terminal point of said vector sequence at a position in said third register corresponding to the boundary coordinate value Xb of said starting point of said vector sequence.

6. An apparatus in accordance with claim 5, wherein said contour extraction means further comprises:

third means for writing vector data of said first Xb-vector in said vector data memory, said vector data including coordinate data (Xs, Ys) of the start point of said first Xb-vector, coordinate data (Xe, Ye) of the end point of said first Xb-vector, and link data indicating connection between said start point with said end point; and said first means comprises:

means for writing address values of said vector data for said start point and said end point of said first Xb-vector, which vector data are stored in said vector data memory, at respective positions in said first register corresponding to the boundary coordinate value Xs of said start point and the boundary coordinate value Xe of said end point, respectively, and writing the boundary coordinate value Xs of said start point at a position in said second register corresponding to the boundary coordinate value Xe of said end point; and writing the boundary coordinate value Xe of said end point at a position in said third register corresponding to the boundary coordinate value Xs of said start point; and said second means further comprising:

means for detecting said Yb-vector as a function of registered data in said first register, writing said link data for said detected Yb-vector in said vector data memory, updating registered data in said second register and said third register related to said starting point and said terminal point of said vector sequence including said detected Yb-vector, and eliminating data related to the start point and the end point of said detected Yb-vector stored in said first, second and third registers, to thereby connect said detected Yb-vector successively with said first Xb-vector and said second Xb-vector; and means for identifying said vector sequence as that representing a closed-loop contour under the conditions that the coordinate value stored at a position in said second register corresponding to said boundary coordinate value Xs of said start point is identical with the coordinate value stored at a position in said third register corresponding to said boundary coordinate value Xs of said start point and that the coordinate value stored at a position in said second register corresponding to said boundary coordinate value Xe of said end point is identical with the coordinate value stored at a position in said third register corresponding to said boundary coordinate value Xe.

7. An apparatus in accordance with claim 5, further comprising:

an image memory for storing multi-tone image data representing a multi-tone image; and means for converting said multi-tone image data into said binary image data with a predetermined threshold value.

8. An apparatus in accordance with claim 5, wherein said contour extraction means comprises:

means for comparing coordinate values of three consecutive boundary positions indicated by the first set of said run-data and coordinate values of three consecutive boundary positions indicated by the second set of said run-data, to thereby detect said first Xb-vector and said Yb-vector.

* * * * *